United States Patent [19]

Lipo et al.

[11] Patent Number: 5,825,113
[45] Date of Patent: Oct. 20, 1998

[54] DOUBLY SALIENT PERMANENT MAGNET MACHINE WITH FIELD WEAKENING (OR BOOSTING) CAPABILITY

[75] Inventors: Thomas A. Lipo, Middleton; Yue Li, Madison, both of Wis.

[73] Assignee: Electric Power Research Institute, Inc., Palo Alto, Calif.

[21] Appl. No.: 498,194

[22] Filed: Jul. 5, 1995

[51] Int. Cl.$^6$ .................................................. H02K 21/04
[52] U.S. Cl. ...................... 310/181; 310/154; 310/180; 310/68 B; 310/162; 310/166; 310/190; 310/179; 310/168
[58] Field of Search ................................... 310/154, 186, 310/181, 152, 180, 68 B, 161, 162, 163, 179, 166, 190, 165

[56] References Cited

U.S. PATENT DOCUMENTS

| | | | |
|---|---|---|---|
| 2,816,240 | 12/1957 | Zimmerman | 310/155 |
| 2,968,755 | 1/1961 | Baermann | 310/154 |
| 3,370,189 | 2/1968 | Haydon et al. | 310/49 |
| 3,439,200 | 4/1969 | Saito et al. | 310/49 |
| 3,495,107 | 2/1970 | Haydon | 310/49 |
| 3,541,407 | 11/1970 | Lahde | 318/138 |
| 3,553,509 | 1/1971 | Schellekens | 310/154 |
| 3,789,250 | 1/1974 | Macoit et al. | 310/154 |
| 3,862,445 | 1/1975 | Volkrodt | 310/154 |
| 3,984,711 | 10/1976 | Kordik | 310/49 |
| 4,011,479 | 3/1977 | Volkrodt | 310/186 |
| 4,150,312 | 4/1979 | Armstrong et al. | 310/42 |
| 4,476,422 | 10/1984 | Kirschbaum | 310/198 |
| 4,654,551 | 3/1987 | Farr | 310/112 |
| 4,656,379 | 4/1987 | McCarty | 310/181 |
| 4,728,833 | 3/1988 | Shiraki et al. | 310/68 R |
| 4,755,736 | 7/1988 | Fluegel | 322/46 |
| 4,757,224 | 7/1988 | McGee et al. | 310/168 |
| 4,761,574 | 8/1988 | Nakagawa | 310/12 |
| 4,891,537 | 1/1990 | Shiraki et al. | 310/68 B |
| 4,970,423 | 11/1990 | Tamae et al. | 310/162 |
| 4,972,112 | 11/1990 | Kim | 310/181 |
| 5,051,640 | 9/1991 | Freise | 310/162 |
| 5,059,884 | 10/1991 | Shah et al. | 318/701 |
| 5,132,581 | 7/1992 | Kusase | 310/263 |
| 5,177,391 | 1/1993 | Kusase | 310/263 |
| 5,304,882 | 4/1994 | Lipo et al. | 310/156 |

FOREIGN PATENT DOCUMENTS

| | | | |
|---|---|---|---|
| 2416266 | 10/1974 | Germany | 310/154 |
| 446511 | 3/1968 | Switzerland | 310/154 |

*Primary Examiner*—Steven L. Stephen
*Assistant Examiner*—B. Mullins
*Attorney, Agent, or Firm*—Leonard Bloom

[57] ABSTRACT

A permanent magnet machine combines both principles of variable reluctance machines and permanent magnets, and comprises a rotor with salient rotor poles and a stator with salient stator poles. A pair of ferrite arched permanent magnets are embedded in the stator yoke beneath respective stator poles and are arranged symmetrically around the central axis of the machine. A field winding for boosting or weakening the primary flux generated by the permanent magnets is wound in a special arrangement.

16 Claims, 25 Drawing Sheets

PHASE FLUX LINKAGE UNDER DIFFERENT FIELD EXCITATION LEVELS

DOUBLY SALIENT PERMANENT MAGNET MACHINE WITH FIELD WEAKENING (OR BOOSTING) CAPABILITY

FIELD OF THE INVENTION

The present invention relates to variable reluctance machines, and particularly, to doubly salient permanent magnetic machines with field weakening or boosting capabilities, functioning as motors or generators.

BACKGROUND OF THE INVENTION

In an attempt to realize high performance in electric machines, the choice of using permanent magnet (PM) materials is getting more and more popular for many applications. A common disadvantage of conventional PM machines is the low feasibility of field flux control, which limits the operation of these machines over a wide speed range. Coming as a result of the effort to improve the performance of conventional PM machines, the concept of doubly salient PM machines provides a new insight to understanding of electric machines. In general, the combination of the principle of variable reluctance machines and the use of PM excitation results in a machine possessing the advantages mentioned above namely, simple structure and high power density. Moreover, this kind of machine can work well at higher speeds by making use of the inherent reluctance torque. Doubly salient permanent magnet machines possess higher power density and better performance than conventional machines.

In doubly salient structures of permanent magnet machines, the rotor and the stator each comprises salient poles spaced at equal angular intervals, different angle intervals could be achieved in some doubly salient structures; and the salient poles of the stator have respective windings. Permanent magnets producing a magnetizing flux may be incorporated into the rotor; this is described, for example, in U.S. Pat. No. 5,304,882, or in the stator, as described, for example, in the pending application Ser. No. 07/926,765, filed Aug. 6, 1992, and as shown in FIGS. 1 and 2 of the present application.

The doubly salient structure works with the permanent magnets or auxiliary field winding to alter the magnetic circuit of the motor (or generator), thereby improving the flux linkage.

While maintaining all the advantages of doubly salient machines with permanent magnets buried in the stator, the above-mentioned structures, however, have the following inherent problems:

1. The special placement of permanent magnets in the stator leads to a square or oval shape of the machine that is not suitable for machine housings currently available in the market. If a round machine is used, more steel and rare earth permanent magnets will be needed which would result in not fully using the steel of the stator yoke; in addition the overall cost of the machine is significantly higher.

2. Low feasibility for controlling the field flux when it is necessary. This is also a major inherent problem in other a.c electric machines employing permanent magnets as a means of field excitation.

It would be highly desirable to enjoy a great output voltage, quick response, and higher efficiency inherent in doubly salient permanent magnetic machines in combination with the round cylindrical shape, lower overall cost, lower leakage flux, field weakening or boosting capability, easier demagnetization protection and lighter weight.

SUMMARY OF THE INVENTION

It is, therefore, an object of the present invention to provide a variable reluctance machine of a doubly salient structure and having stationary permanent magnets in the stator capable of efficient and economical use as a motor or a generator.

It is another object of the present invention to provide a doubly salient permanent magnetic machine having high power density, field weakening or boosting capability, easy demagnetization protection, low cost and light weight.

It is still an object of the present invention to provide a round cylindrical doubly salient machine utilizing ferrite permanent magnets in the stator instead of rare earth permanent magnets, these permanent magnets being arranged in the stator in a special manner.

It is a further object of the present invention to provide a doubly salient PM machine, wherein the stator comprises two windings, one of which is always coupled with the flux path of the machine and arranged in such a manner as to provide a field weakening or boosting.

According to the teachings of the present invention, a permanent magnet machine includes a rotor mounted for rotation about a central axis and having salient rotor poles spaced at equal angular intervals, and further includes a stator having a stator yoke of a round shape in its cross-section with salient stator poles spaced at equal angular intervals around the central axis and extending inwardly of the stator yoke.

A pair of arched (round in their cross-section) permanent magnets are embedded in the stator yoke, each within a respective first or second section of the stator yoke and underneath the corresponding stator poles. A field winding is interposed between the first and second sections and is wound along a length of the stator yoke. The field winding is permanently coupled with a main flux path.

Armature windings are wound on the stator; each winding is individually coiled about a pair of diametrically opposite stator poles.

The first and the second permanent magnets are ferrite permanent magnets, which are polarized transversely to the central axis of the machine to serve as a source of a primary flux for magnetizing the machine.

Once the field winding is excited by energizing means, it is capable of producing magnetizing or demagnetizing ampere turns to boost or to weaken the primary flux produced by the first and the second permanent magnets. If the field winding is not excited, it can be used to detect the rotor position by measuring the voltage induced in the field winding by the variation of the flux linking the field winding by the armature coils as a function of a rotor angle.

A suitable means converts a three-phase alternating current into unregulated direct current.

If the ratio of rotor poles to stator poles is 4:6, and the armature windings are three-phase armature winding, the machine works as a motor or as a three-phase generator.

If the ratio of rotor poles to stator poles is 6:4 (for instance, four stator poles and six rotor poles) a pair of armature windings is wound around the stator poles; and the converter means is connected to these armature windings for converting alternating current obtained from the first and second armature windings to direct current, such that the machine may perform as a single-phase generator.

It will be appreciated by those skilled in the art, that both the permanent magnet and the field winding are not mandatory for the machine of the present invention to function. Other, simplified versions of this topology could be realized by taking out the permanent magnets (replacing it with iron), in which case only the field winding is used for excitation. Alternatively, the field winding could be removed retaining only the permanent magnets. While field weakening/boosting capability would be lost, the resulting machine would function satisfactory as a PM type machine.

Other objects, features, and advantages of the present invention will become more apparent from the following detailed description of preferred embodiments and certain modifications thereof when taken together with the accompanying drawings.

DETAILED DESCRIPTION OF THE PREFERRED EMBODIMENT

Figure 1:
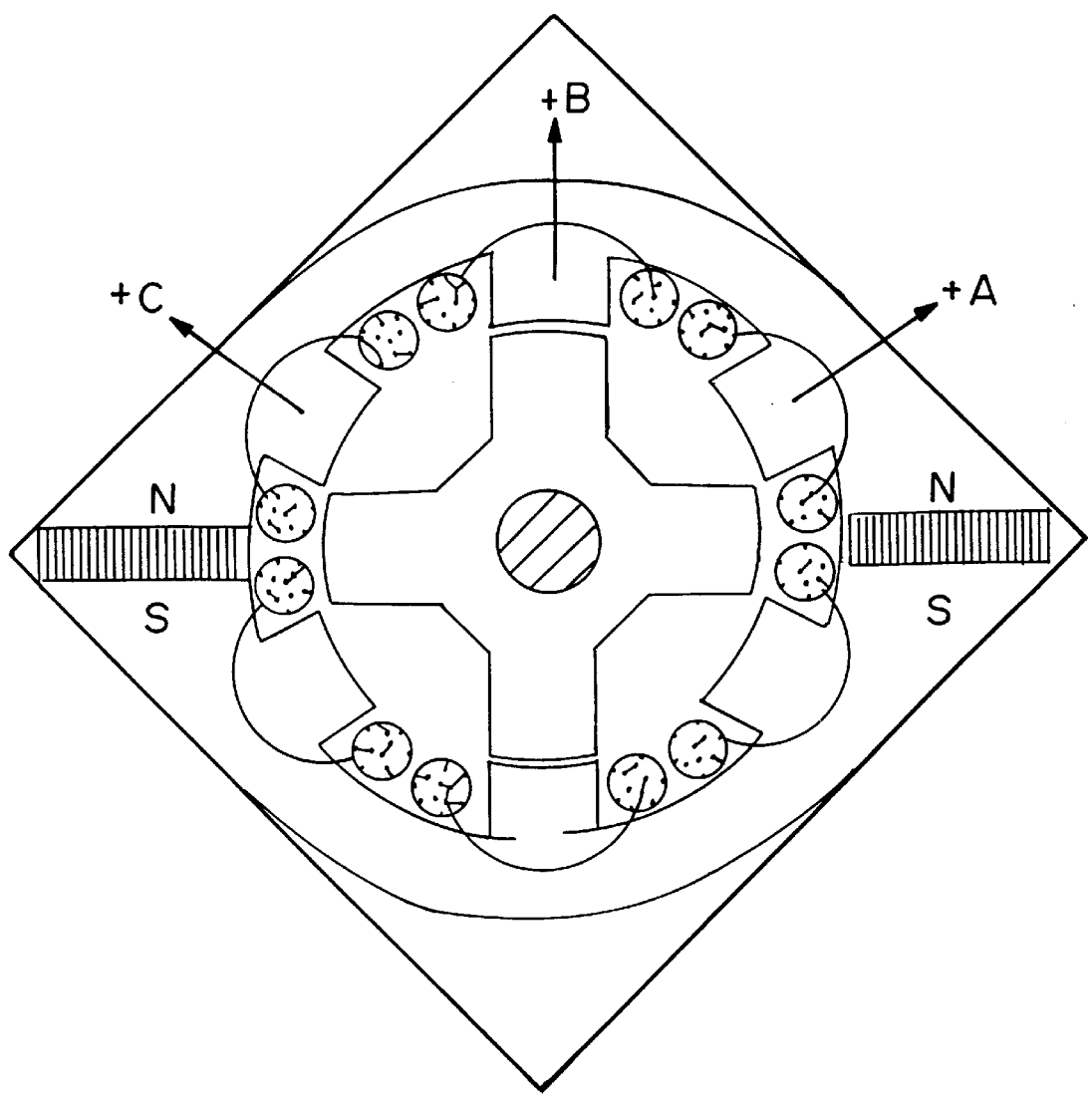
FIG. 1 is a cross-section of a three-phase doubly salient PM motor of the prior art.
Figure 2:
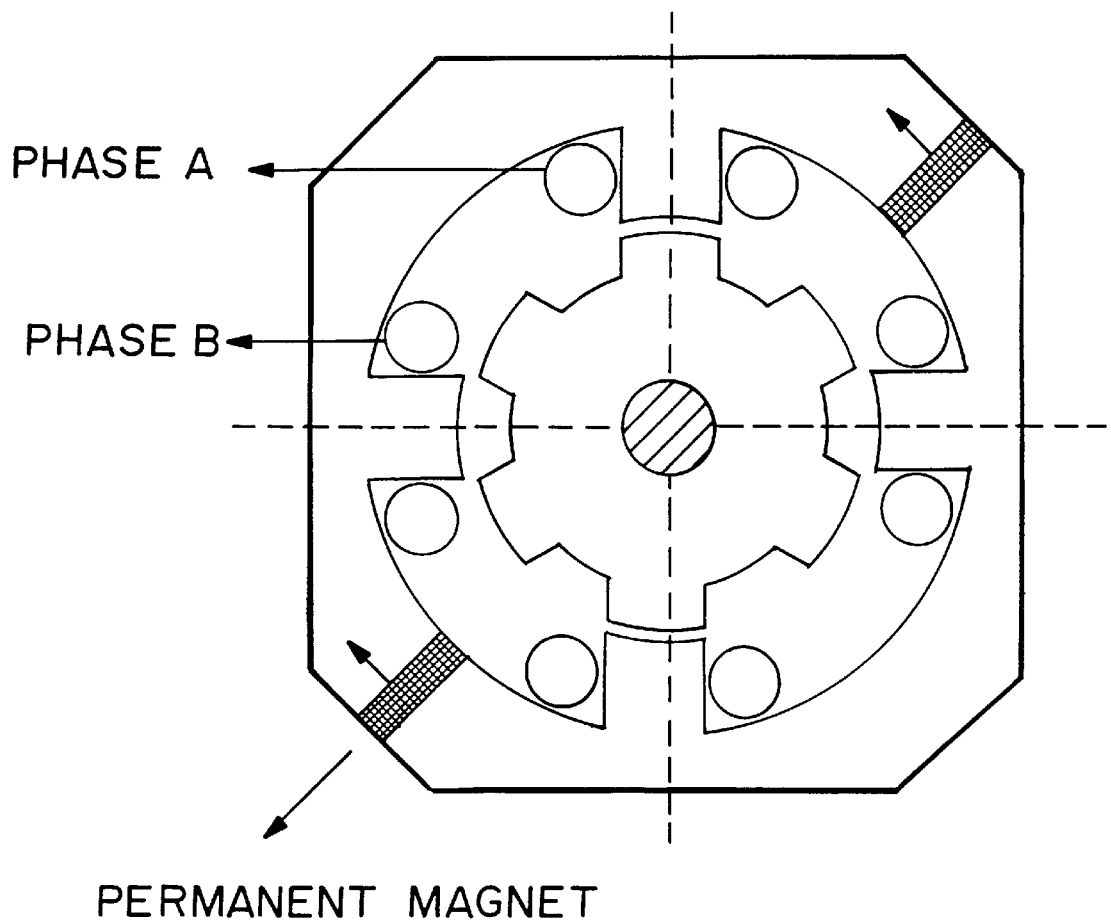
FIG. 2 is a cross-section of a single-phase doubly salient PM generator of the prior art.
Figure 3:
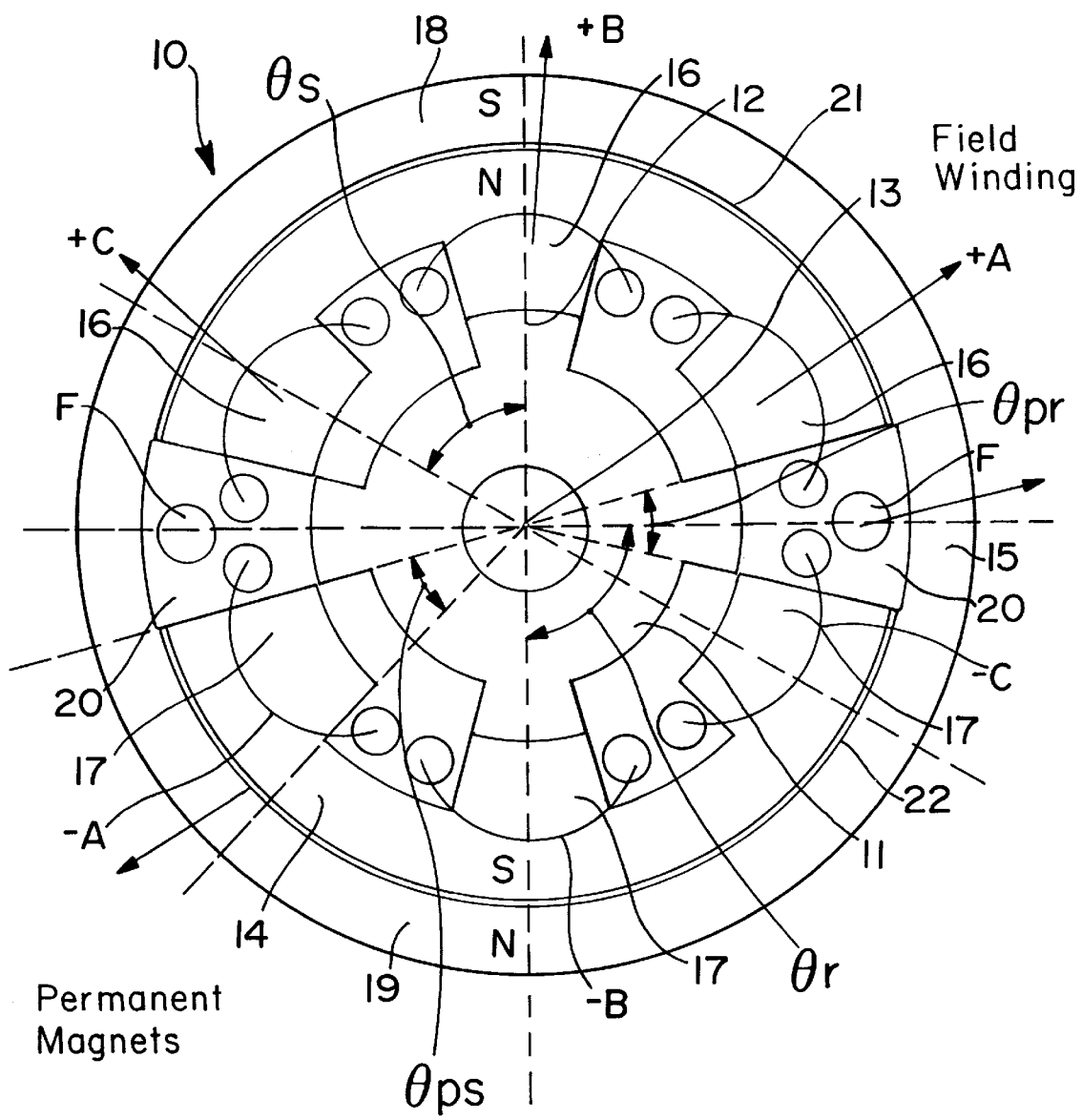
FIG. 3 is a cross-section of a three-phase doubly salient PM motor of the present invention.

With reference to FIG. 3, showing a cross-section of a three-phase doubly salient permanent magnet (PM) machine 10 of the present invention, field weakening doubly salient permanent magnet (FWDSPM) motor, a rotor 11 consists of a plurality of discrete laminated layers each of which is punched to form four (4) salient rotor poles 12 positioned at angular intervals θr of π/2 radians. Each rotor pole 12 has a pole arc θpr equal to or slightly greater than π/6 radians. The rotor 11 is mounted for rotation about a central axis 13 as is known by those skilled in the art.

A stator 14 includes a stator yoke 15 having a round shape in its cross-section. The stator 14 consists of a plurality of discrete laminated layers, each layer being punched to form salient stator poles. As best shown in FIG. 3, the stator 14 includes three stator poles 16 and three stator poles 17, wherein the stator poles 16 are positioned within a first section 18 of the stator yoke 15, and wherein the stator-poles 17 are positioned within a second section 19 of the stator yoke 15. The first and the second sections 18, 19 are similar to each other by their shape and size and are arranged symmetrically around the central axis 13. The stator poles 16 and 17 are spaced at angular intervals θs of π/3 radians, each having a pole arc Ops of π/6 radians.

The first and the second sections 18 and 19 are spaced from each other at angular intervals 20 of π/6 radians each.

A pair of ferrite arched permanent magnets (PM) 21, 22 are embedded in the stator yoke 15, such that the PM 21 is located within the section 18 of the stator yoke 15 and interposed beneath the stator poles 16, and PM 22 is located within the section 19 of the stator yoke 15 and interposed beneath the stator poles 17. The PMs 21, 22 are shaped as segments of a cylinder and extend the length of the stator yoke 15. As best shown in FIG. 3, the PMs 21 and 22 follow the shape of the stator yoke 15 and have a shape of circular segments in their cross-section. Therefore, the PMs 21 and 22 are incorporated in the stator without unduly increasing the overall motor size.

Since the permanent magnets 21, 22 are stationary, the magnetic force between the stator yoke 15 and PMs 21 and 22 is great enough to hold the PMs 21 and 22 in position. Hence, any conventional fixture can be used to secure the PMs 21 and 22.

The stator 14 is wound with three armature windings A, B, C, corresponding to three phase alternating current. Each armature winding (for instance, the winding of phase A) comprises two coils +A and −A connected in series, and each is wound individually about one of the stator poles 16 and a corresponding diametrically opposite one of the stator poles 17.

It will be appreciated by those skilled in the art that other suitable stator/rotor poles arrangements are possible. For example, multiples of 6/4 may be used, such as 12/8, etc. The essential feature is that the PMs 21, 22 face a constant reluctance flux path at all times, that is, the total overlapping stator/rotor pole areas must remain constant.

The armature windings arrangement of FIG. 3 yields the following exemplary alternating phase sequence during one complete revolution: +A→+B→+C→−A→−B→−C, and functions in the same way as a three-phase armature winding does in conventional variable reluctance machines.

Another essential feature of embodiment shown in FIG. 3, comprises a field winding F interposed between the sections 18 and 19 of the stator yoke 15 within the angular intervals 20 and wound along the length (not shown) of the stator yoke 15. The field winding is always coupled with the primary flux path generated by the PMs 21 and 22 polarized transversely to the central axis 13, and has two functions:

1. When the field winding F is excited by means known to those skilled in the art, it can be used to produce necessary magnetizing or demagnetizing ampere turns to boost or weaken the existing field that is established by the PMs, 21, 22.

The capability of field weakening or field boosting for the machine of the present invention comes with a special arrangement for the field winding F. Particularly, in this case, the total reluctance seen by the field winding is small enough to allow for a substantial field winding, and is capable of providing necessary magnetizing or demagnetizing ampere turns.

2. When the field winding F is not excited, it can be used to detect the rotor position by measuring the voltage induced in the field winding F by the variation of the flux linking the field winding F by the armature coils, +A, −A, +B, −B, +C, −C, as a function of the rotor angle. Using this feedback, a sensorless or encoderless control could be achieved.

Figure 4:
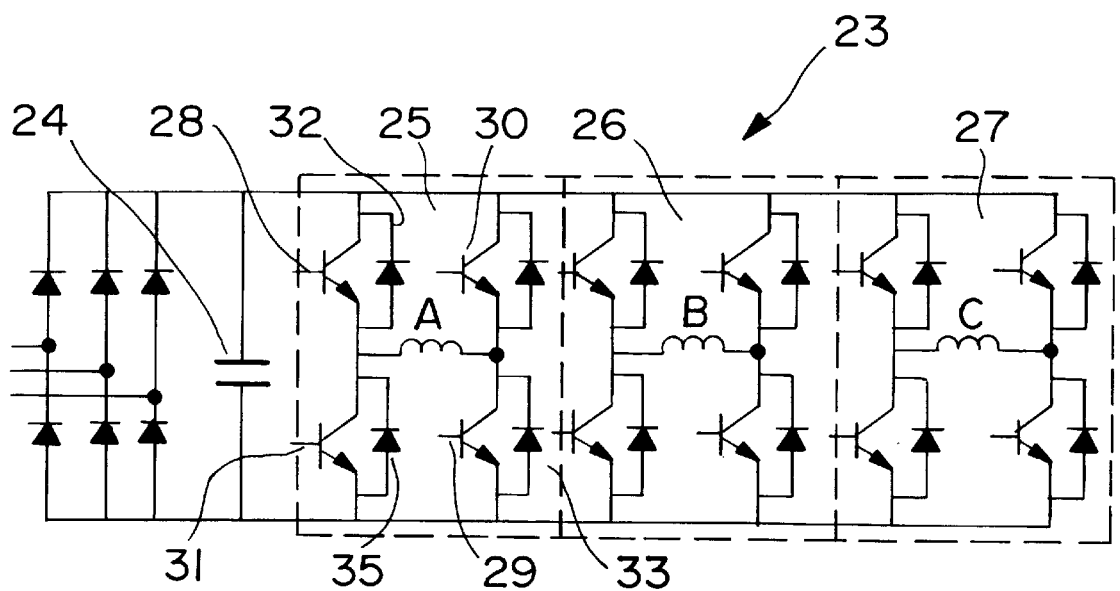
FIG. 4 is a converter topology of motor of FIG. 3.
Figure 5:
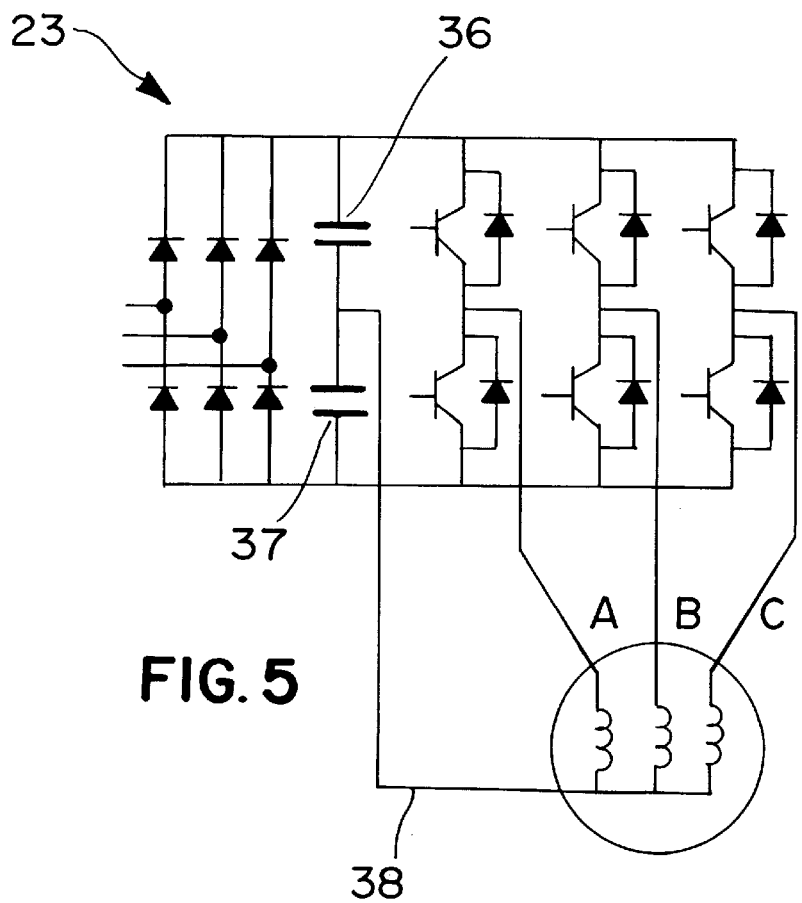
FIG. 5 is another converter topology of the motor of FIG. 3.
Figure 6:
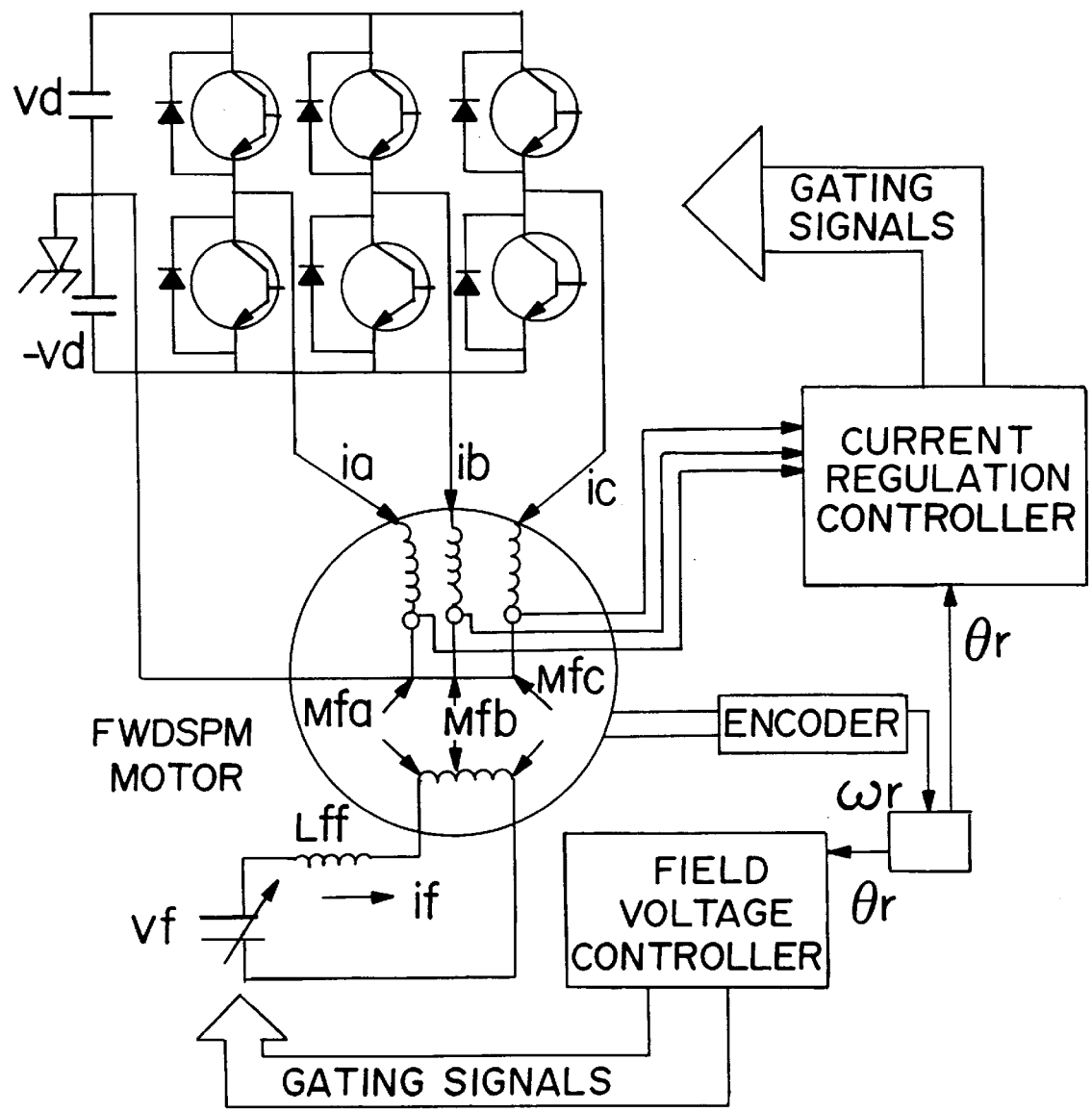
FIG. 6 is a topology for speed control of the field weakening doubly salient permanent magnet (FWDSPM) motor of the present invention.

FIGS. 4 and 5 show two alternative converter topologies suitable for use in driving the above-described embodiment of the present invention, and FIG. 6 illustrates one of the possible control topologies for field weakening doubly salient permanent magnet motor of the present invention.

In the embodiment of FIG. 4, a bridge rectifier 23 is provided. Bridge rectifier 23 converts a three phase AC power input to unregulated DC. A capacitor 24 is connected in parallel across bridge 23 for smoothing the ripple. Three individual current switches 25–27 are also connected in parallel with bridge rectifier 23 and capacitor 24. Each current switch comprises at least two switch devices (for example, switch 25 includes switch devices 28 and 29) which may be conventional transistors or thyristors (with auxiliary commutating means) connected in series with a corresponding one of the stator windings A–C. Each current switch 25–27 may also include two additional switch devices (for example, switch 27 may include switch devices 30 and 31) for the purpose of making the converter a bi-polar converter. In addition, diodes such as 32–35 are provided in parallel across each one of the switch devices to provide a path for reactive energy flow.

In the embodiment of FIG. 5, the neutral of the machine is connected to a center point on the DC bus by splitting the DC link capacitor 24 of FIG. 4 into two equal capacitances. Only six switch devices are needed as compared with FIG. 4. The function of each of the switch devices is the same as FIG. 4. As was shown in FIG. 6, equal positive and negative currents ideally flow into two of the three phases of the motor while the current in the third phase is zero. Thus, current ideally does not flow in the motor neutral line 38. However, when practical considerations are taken into account, small current pulses will flow in this motor neutral line 38 during each period where the motor current transfers from one phase to another. Hence, the effect of this current on the rating of the DC link capacitors will be minimal.

As best shown in FIG. 6, delta regulation is used in the current controller and a PWM rectifier is used as the field voltage controller. The tasks of the field voltage controller are:

i) To provide the proper ampere turns to boost or weaken the PM field. The behavior of the controller in this case is similar to a DC voltage source with polarity change capability.

ii) To assist current commutation and reduce torque ripple by controlling the saturation level of the motor. The behavior of the controller in this case is likened more to an AC voltage source with a DC component than a simple DC source.

As a result of the mutual coupling between the field winding and the armature windings, the variation of rotor angle will result in special AC current components in the field winding. Based on this mechanism, encoderless control can be realized in field weakening doubly salient permanent magnet motors.

Figure 7:
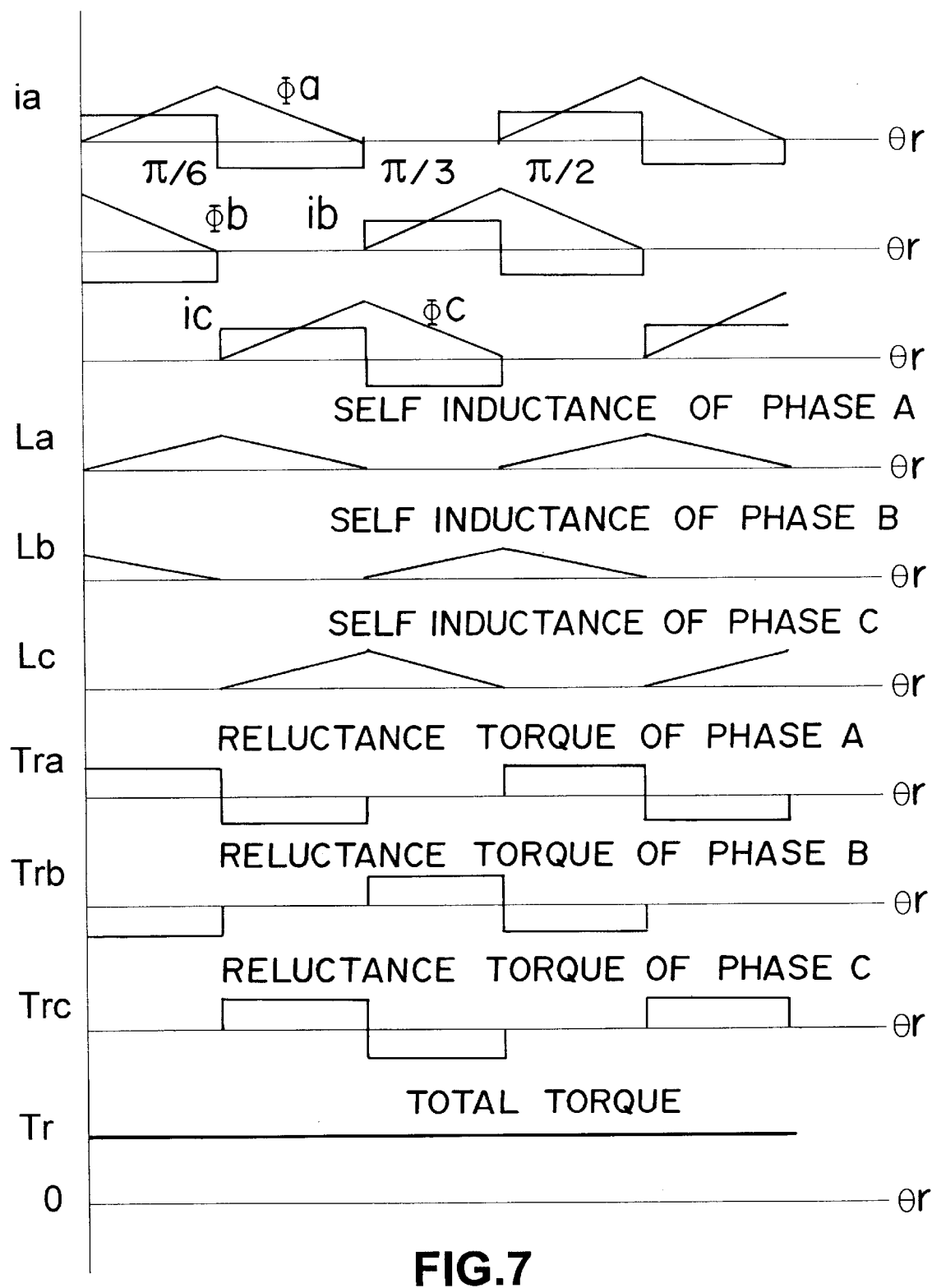
FIG. 7 illustrates operating principles of the field weakening doubly salient permanent magnet (FWDSPM) motor of FIG. 3.

Due to the existence of PMs and the doubly salient structure of the machine, there are two kinds of torque produced in a field weakening doubly salient permanent magnet motor: the PM torque (reaction torque), and the reluctance torque. The currents must be controlled properly with the variation of phase PM flux linkage to obtain maximum PM torque which is normally the desired torque in this design, as shown in FIG. 7. On the other hand, reluctance torque is also produced due to the saliency and is responsible for torque ripple at normal operating speed. To obtain smoother torque production, the reluctance torque should be controlled to be as small as possible. From a motor design point of view, both the magnitude and waveform of inductances must be carefully chosen in the design. In the proposed field weakening doubly salient permanent magnet motor topology, part of the armature reaction flux will go through the magnets leading to a special self-inductance waveform, as shown in FIG. 7. The advantage of this waveform is the cancellation of the reluctance torque caused by self-inductance variation, which guarantees less torque pulsation in this doubly salient structure. The magnitude of inductances can also be controlled by adjusting the field current. When field boosting mode is used (magnetizing field ampere turns), the iron of the motor will be highly saturated to limit the armature reaction flux. Based on this mechanism, torque ripple of this type of motor can be controlled without affecting the phase currents, which is very important property of this design. As will be shown below, this property leads to 2 p.u. torque capability of this motor (an extremely desirable feature for traction applications).

The machine discussed in reference to FIGS. 3–7, can work either as a motor or a three-phase generator. It can be run at very high speeds by controlling the current to produce the reluctance torque or keeping the normal current waveform of low speed operation in conjunction with the field weakening control. This invention will be suitable for a variety of high performance electric machine drive systems and electric generating applications over a very wide speed range, regardless of the power ratings, or the number of poles of machines, provided a 6/4 stator/rotor pole ratio is kept.

The phase voltage equations of a three phase version of this machine can be expressed as follows:

$$\begin{bmatrix} ua \\ ub \\ uc \end{bmatrix} = \begin{bmatrix} ra & 0 & 0 \\ 0 & rb & 0 \\ 0 & 0 & rc \end{bmatrix} \begin{bmatrix} ia \\ ib \\ ic \end{bmatrix} + \begin{bmatrix} ema \\ emb \\ emc \end{bmatrix} + \frac{d}{dt} \begin{bmatrix} \lambda a \\ \lambda b \\ \lambda c \end{bmatrix} \quad (1)$$

where $\{e_{ma}, e_{mb}, e_{mc}\}$ is the induced emf due to the magnet and the flux linkages and their time derivatives are, $$\begin{bmatrix} \lambda a \\ \lambda b \\ \lambda c \end{bmatrix} = \begin{bmatrix} Laa & Mba & Mca \\ Mab & Lbb & Mcb \\ Mac & Mbc & Lcc \end{bmatrix} \begin{bmatrix} ia \\ ib \\ ic \end{bmatrix} + [L] \begin{bmatrix} ia \\ ib \\ ic \end{bmatrix} \quad (2)$$

and $$\frac{d}{dt} \begin{bmatrix} \lambda a \\ \lambda b \\ \lambda c \end{bmatrix} = [L] \frac{d}{dt} \begin{bmatrix} ia \\ ib \\ ic \end{bmatrix} + \begin{bmatrix} \frac{d[L]}{dt} \end{bmatrix} \begin{bmatrix} ia \\ ib \\ ic \end{bmatrix} \quad (3)$$

So that $$[ia\ ib\ ic] \begin{bmatrix} ua \\ ub \\ uc \end{bmatrix} = [ia\ ib\ ic][R] \begin{bmatrix} ia \\ ib \\ ic \end{bmatrix} + \quad (4)$$

$$[ia\ ib\ ic] \begin{bmatrix} ema \\ emb \\ emc \end{bmatrix} + [ia\ ib\ ic][L] \frac{d}{dt} \begin{bmatrix} ia \\ ib \\ ic \end{bmatrix} + [ia\ ib\ ic] \begin{bmatrix} \frac{d[L]}{dt} \end{bmatrix}$$

Equation (4) can be interpreted as:

$$P_{in} = P_{cu} + T_m + \omega_r + T_r \times \omega_r + \frac{d}{dt} W_f \quad (5)$$

where a) input power $$P_{in} = [ia\ ib\ ic] \begin{bmatrix} ua \\ ub \\ uc \end{bmatrix} \quad (6)$$

b) copper loss $$P_{cu} = [ia\ ib\ ic][R] \begin{bmatrix} ia \\ ib \\ ic \end{bmatrix} \quad (7)$$

c) PM torque $$T_m = [ia\ ib\ ic] \begin{bmatrix} ema \\ emb \\ emc \end{bmatrix} |\theta r = [ia\ ib\ ic] \begin{bmatrix} \frac{d\psi ma}{d\theta r} \\ \frac{d\psi mb}{d\theta r} \\ \frac{d\psi mc}{d\theta r} \end{bmatrix} \quad (8)$$

d) reluctance torque $$T_r = \frac{1}{2} [ia\ ib\ ic] \begin{bmatrix} \frac{d[L]}{d\theta r} \end{bmatrix} \begin{bmatrix} ia \\ ib \\ ic \end{bmatrix} \quad (9)$$

e) energy stored in armature windings $$Wf = \frac{1}{2} [ia\ ib\ ic][L] \begin{bmatrix} ia \\ ib \\ ic \end{bmatrix} \quad (10)$$

Also from (1), the dynamic equations of field weakening doubly salient permanent magnet motor can be expressed by:

$$\frac{d}{dt} \begin{bmatrix} ia \\ ib \\ ic \end{bmatrix} = [L]^{-1}\{[V] - [E]\} - [L]^{-1} \left\{ [R] + \begin{bmatrix} \frac{d[L]}{d\theta r} \end{bmatrix} \omega r \right\} \begin{bmatrix} ia \\ ib \\ ic \end{bmatrix} \quad (11)$$

where a) [V] is the control vector $$[V] = \begin{bmatrix} ua \\ ub \\ uc \end{bmatrix} \quad (12)$$

b) [E] is the PM voltage vector $$[E] = \begin{bmatrix} ema \\ emb \\ emc \end{bmatrix} \quad (13)$$

c) [R] is the resistance matrix $$[R] = \begin{bmatrix} ra & 0 & 0 \\ 0 & rb & 0 \\ 0 & 0 & rc \end{bmatrix} \quad (14)$$

The machine parameters in (11) can be most readily obtained based on a finite element analysis (FEA) of the motor and digital computer simulations can be performed by using the dynamic equations derived herein. Furthermore, control strategies or the trajectory of vector [V] can also be studied based on this model. The PM voltage vector can be written as:

$$[E] = \begin{bmatrix} ema \\ emb \\ emc \end{bmatrix} = \begin{bmatrix} \frac{d\psi ma}{dt} \\ \frac{d\psi mb}{dt} \\ \frac{d\psi mc}{dt} \end{bmatrix} = \begin{bmatrix} \frac{d(\phi ma + Lmaif)}{dt} \\ \frac{d(\phi mb + Lmbif)}{dt} \\ \frac{d(\phi mc + Lmcif)}{dt} \end{bmatrix} = \begin{bmatrix} \frac{d\phi ma}{dt} \\ \frac{d\phi mb}{dt} \\ \frac{d\phi mc}{dt} \end{bmatrix} + \begin{bmatrix} \frac{dLma}{dt} if \\ \frac{dLmb}{dt} if \\ \frac{dLma}{dt} if \end{bmatrix} + \begin{bmatrix} Lma \frac{dif}{dt} \\ Lmb \frac{dif}{dt} \\ Lmc \frac{dif}{dt} \end{bmatrix} \quad (15)$$

where:
$\Phi_{ma}$—no load PM flux linked by phase A
$\Phi_{mb}$—no load PM flux linked by phase B
$\Phi_{mc}$—no load PM flux linked by phase C
$L_{ma}$—mutual inductance between the field winding and phase A
$L_{mb}$—mutual inductance between the field winding and phase B $L_{mc}$—mutual inductance between the field winding and phase C $i_f$—field winding current Usually, the field current $i_f$ varies very slowly and the waveforms of $L_{ma}$, $L_{mb}$, $L_{mc}$ are the same as those of $\Phi_{ma}$, $\Phi_{ma}$, $\Phi_{mc}$. Hence, equations (4–11) remain valid in spite of the fact that [E] is function of the field winding current. In this case, $i_f$ can be considered simply as another control variable.

A finite element analysis for a 10 kW prototype field weakening doubly salient permanent magnet motor has been completed to demonstrate the operating principle. The main task of this analysis was to obtain the necessary parameters for both designing and controlling the machine.

Figure 9:
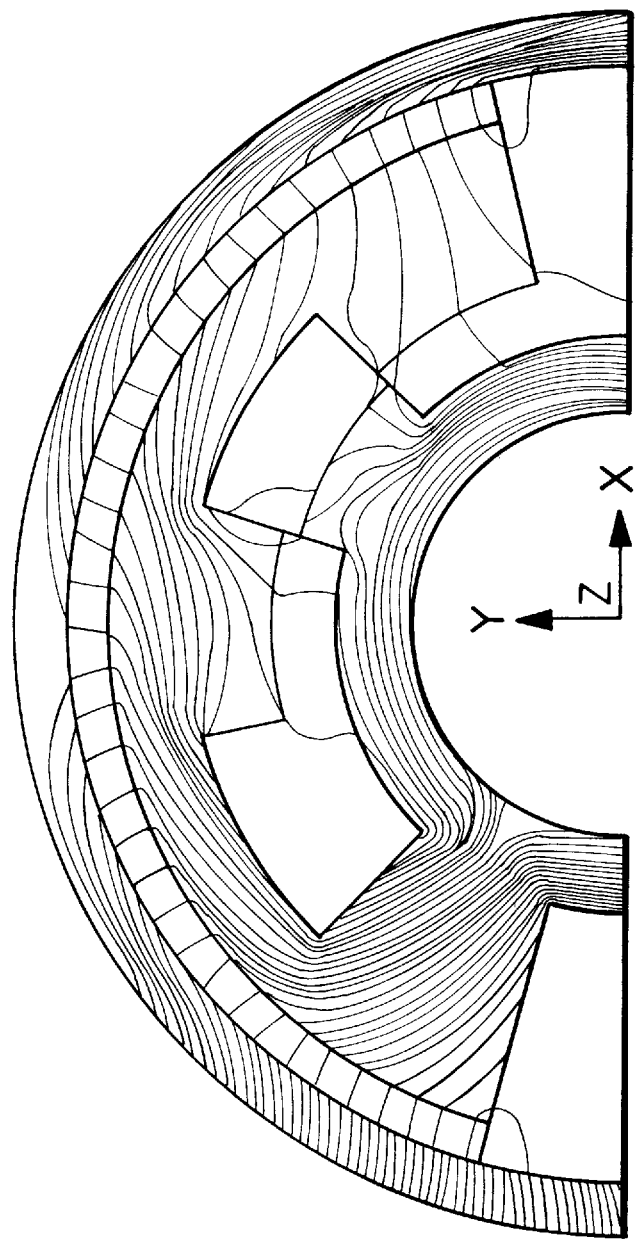
FIG. 9 shows a flux distribution of the field weakening doubly salient permanent magnet (FWDSPM) motor when only PM excitation exists.

FIG. 9 shows flux distribution when excited solely by PM excitation. It can be observed that a very high magnet flux concentration of ratio in the region of 4 to 1 in the active stator pole is achieved. Flux densities in the air gap on the order of 1.2 Tesla can be readily obtained even though the working point within the ferrite magnet is only 0.3 tesla. This fact in turn, illustrates the flux focusing capability, in a doubly-salient permanent magnet structure, far in excess of conventional buried permanent magnet machines.

Figure 10:
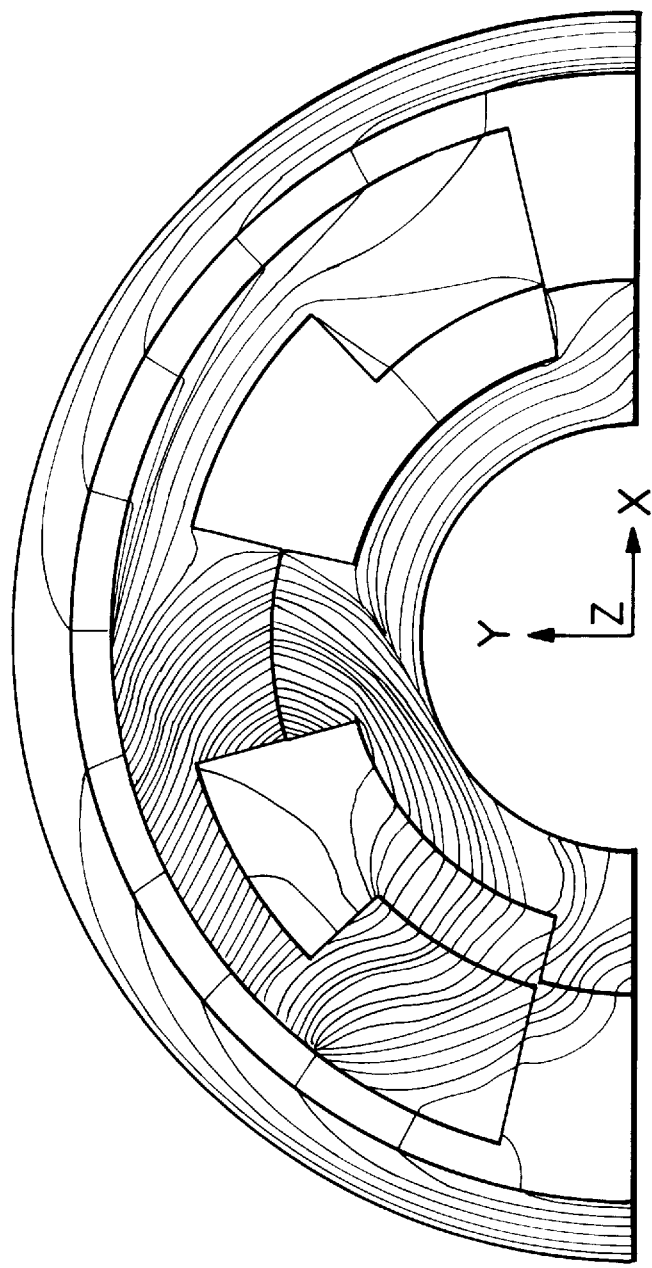
FIG. 10 shows a flux distribution of the prototype field weakening doubly salient permanent magnet motor when only armature current excitation exists.

FIG. 10 shows flux distribution when only armature current exists. The maximum inductance position is shown which occurs when the stator and rotor poles are half-overlapped. The special design of the inductance profile as a function of rotor position leads to reduction of torque ripple as discussed previously.

Figure 11:
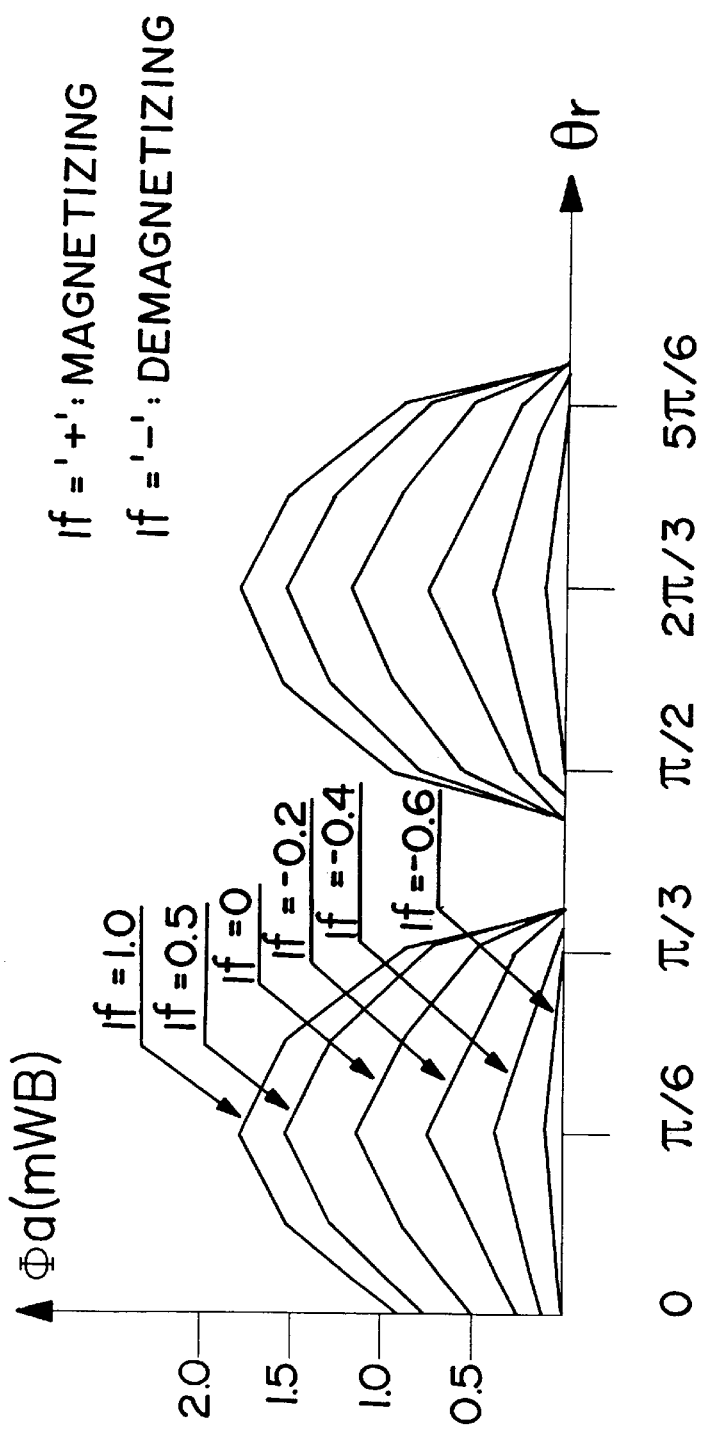
FIG. 11 shows diagrammatically a phase PM flux linkage versus motor angle under different levels of field current excitations.

FIG. 11 shows phase permanent magnet flux linkage versus rotor angle under various levels of field current excitation. Note that very high field forcing is possible when the field current and magnet act to produce flux in the same direction. Conversely, when the two fields oppose, the net flux in the gap can, if necessary, be driven to zero. The FEA indicates that the permanent magnet field can be fully canceled by the demagnetizing MMF provided by the field winding by using only 60–90% of the unit field current (unit field current here is defined as the point where the volume current density of copper reaches 3,000 A/in$^2$).

Figure 12:
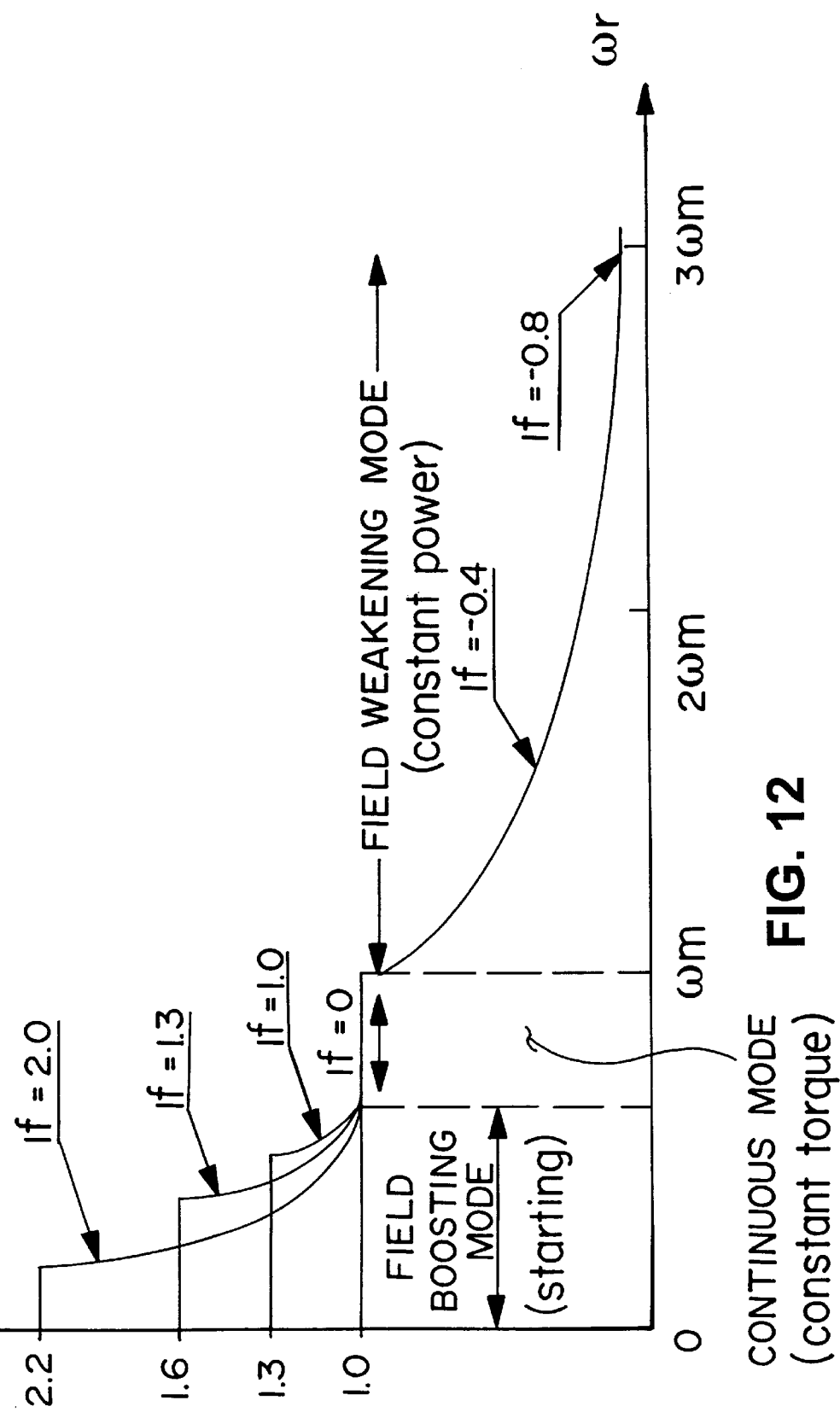
FIG. 12 shows diagrammatically torque-speed characteristics of the field weakening doubly salient permanent magnet motor under different field excitation levels.

Based on the FEA study, the torque vs. speed characteristics of the motor can be determined as shown in FIG. 12. It can be noted that the starting torque capability of the motor can be as high as 2 p.u. when field boosting mode is used. In this case, a highly saturated condition is achieved under this mode to greatly reduce the magnitude of inductances and thus the cogging torque.

Based on the above analyses, the power density of the field weakening doubly salient permanent magnet motor can be obtained. Since the reluctance torque contributes no average torque to the torque production of the machine under normal operation condition, only the permanent magnet torque is considered for output power calculation.

The phase back-emf due to the variation of permanent magnet flux linkage can be expressed as:

$$E = \frac{P_s}{m} \times \frac{N_p \times \phi_m}{\theta_d} \omega r \quad (16)$$

where:

$P_s$—stator pole number
$N_p$—turn number per pole
$\Phi_{pm}$—peak PM flux linked by one pole coil (Wb)
$\omega r$—rotor speed (rad/sec)
$\theta_d$—half period of PM flux variation (rad)
m—phase number and, $$\Theta_d = \frac{\pi}{P_s} \quad (17)$$

$$\omega r = \frac{2\pi \times n_s}{60} \quad (18)$$

where $n_s$—mechanical speed (rpm).

From surface current density:

$$A = \frac{2N_p \times I_{rms} \times P_s}{\pi D_i} \quad (19)$$

where $D_i$—stator inner diameter (M)
$I_{rms}$—phase current rms value (A)

From (19), $N_p$ can be expressed as:

$$N_p = \frac{\pi D_i \times A}{2I_{rms} \times P_s} \quad (20)$$

The per pole permanent magnet flux is:

$$\phi_m = K_d \times \frac{\pi D_i}{2P_s} \times L_e \times B_g \quad (21)$$

where $K_d$—PM flux leakage factor
$L_e$—stack length (M)
$B_g$—flux density in the air gap (Tesla).

From (16)–(21):

$$M \times E \times I_{rms} \times \eta = k_d \frac{\pi^2}{120} \eta \times B_g \times A \times n_s \times D_i^2 L_e \quad (22)$$

where $\eta$—efficiency.

Note that the output power of this motor is:

$$P_{out} = M \times E \times I_{avg} \times \eta = M \times E \times K_i \times I_{rms} \times \eta$$

where $I_{avg}$ is the average phase current and current factor $K_i$ is expressed as:

$$K_i = \frac{I_{avg}}{I_{rms}} \quad (23)$$

Hence, the output equation of the field weakening doubly salient permanent magnet motor can be obtained:

$$P_{out} = k_d \times K_i \frac{\pi^2}{120} \eta \times B_g \times A \times n_s \times D_i^2 L_e \quad (24)$$

Comparing this result to the well-known output equation of induction machine (IM), namely, $$P_{out}IM = \frac{\sqrt{2}}{120} \pi^2 \eta \times \cos\phi \times n_s \times B_g0 \times A \times D_i^2 L_e \quad (25)$$

the power density ratio of the two machines can thus be obtained, $$\xi = \frac{P_{out}FWDSPM}{P_{out}IM} = \frac{K_i}{\sqrt{2}} \frac{K_d}{\cos\phi IM} \frac{B_g}{B_g0} \quad (26)$$

Note that the constant $K_d$ for the field weakening doubly salient permanent magnet motor is generally 0.8–0.9 which is about the same range as the power factor in an IM. The air gap flux density is the same as the tooth flux in a field weakening doubly salient permanent magnet motor, so that it can be as the tooth flux in a field weakening doubly salient permanent magnet motor, so that it can be chosen as twice that of the IM. Based on this analysis, the power density ratio can be further expressed as:

$$\xi = \frac{2K_i}{\sqrt{2}} \quad (27)$$

Due to the current waveform in the field weakening doubly salient permanent magnet motor (shown in FIG. 7), if 60 electrical degrees is assumed in one stroke to correspond to the current commutation time, $K_i$ is calculated to be:

$$K_i = \frac{5}{\sqrt{42}} \quad (28)$$

So that $$\xi = \frac{5}{\sqrt{21}} = 1.09 \quad (29)$$

From the derivation, a 9% power density increase is achieved without the help of the field winding. Also, recall that the stator surface current densities for the two motors were assumed the same. However, the current density of field weakening doubly-salient permanent magnet motor can be greater than the IM since a field weakening doubly salient permanent magnet motor does not require rotor current. In reality, higher power density can be achieved in the field weakening doubly salient permanent magnet motor by using the field boosting mode. Assuming that a one p.u. field current is used, from the FEA the per pole flux linkage could be increased by 50%, which suggests that the resultant permanent magnet torque can be increased by 50%. The performance of this machine can now be verified as follows:

The additional copper loss due to the excitation of the field current is:

$$P_{cuf} = \rho \times J \times V_{cuf} \quad (30)$$

where:

ρ—resistivity of copper

J—volume current density $V_{cuf}$—copper volume of the field winding.

The volume $V_{cuf}$ in the proposed design is about 1.5 times of the copper volume of one phase armature winding $V_{cu}$. The armature winding copper loss can thus be expressed by:

$$P_{cu} = 3 \times \rho \times J \times V_{cu} \quad (31)$$

Hence, $$P_{cuf} = \frac{1.5}{3} P_{cu} = \frac{1}{2} P_{cu} \quad (32)$$

From the above analysis, the output power is increased by 50% and the copper loss increased by 50%. If the iron loss is ignored, the efficiency of the motor will remain the same. However, for a one p.u. field boosting mode, the power density ratio without sacrificing good overall performance of the machine will be:

$$\xi = 1.5 \times 1.09 = 1.635 \quad (33)$$

Digital simulations have been carried out for the design of a 3 phase 10 kw prototype field weakening doubly salient permanent magnet motor. Machine data and performance calculation results are shown below:

| Machine Data | |
|---|---|
| stator outer diameter | 10.5 inch |
| stator inner diameter | 6.0 inch |
| stack length | 7.0 inch |
| stator pole number | 6 poles |
| rotor pole number | 4 poles |
| stator/rotor pole arc | 30°/30° |
| stator slot depth | 0.65 inch |
| mechanical speed | 1800 rpm |
| Machine Performance | |
| DC bus voltage | 250 volts |
| maximum inductance | 1.79 mH |
| minimum inductance | 0.35 mH |
| phase peak current | 100 A |
| phase current RMS | 70.6 A |
| output power | 10.6 kw |
| efficiency | 96.5% |

Figure 8:
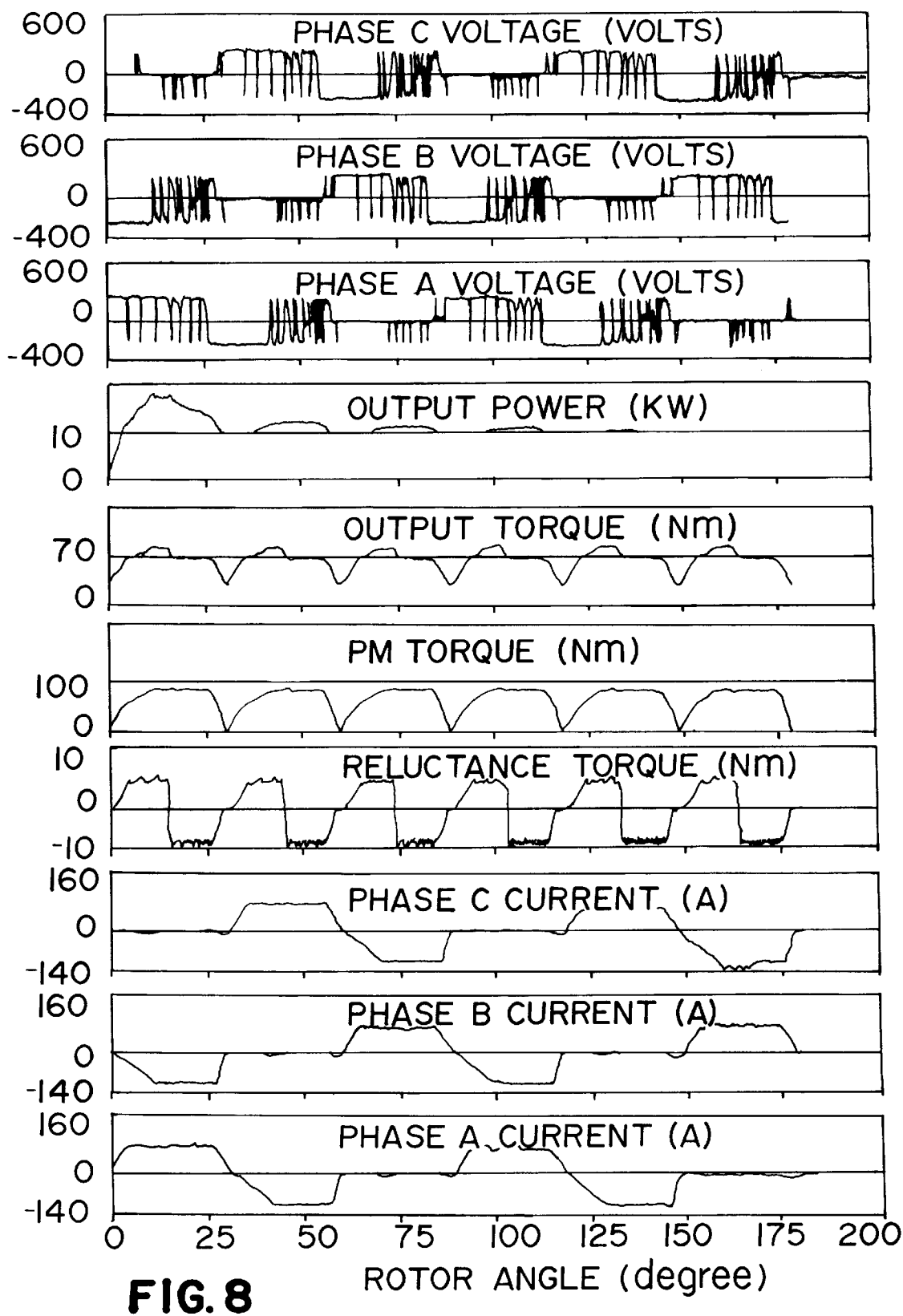
FIG. 8 illustrates current waveforms of the motor of the present invention.

The simulation is based on the derived dynamic equations and the parameters obtained from the FEA. The current and voltage waveforms and torque production of the machine are shown in FIG. 8 and demonstrate the basic dynamic behavior of the machine. Of particular interest is the torque production of this machine which is composed of both PM and reluctance components. Note, in particular, that only a very small contribution to the overall torque is made by the reaction torque. While this simulation was based on a finite element study, only several rotor positions were chosen to calculate inductances as function of current. Between any two adjacent positions, a linear relation was assumed to interpolate the values of inductances. A more accurate model of the motor is presently under development to simulate in detail the complete nonlinear behavior of the system.

As a result of the above-submitted discussions and as shown in FIGS. 3–12, it will be appreciated by those skilled in the art, that the new type of doubly salient PM motor capable of 100% field weakening and 2 p.u. torque capability is proposed in this paper which offers improved performance, high power density, low cost, field control capability, and a robust structure for variable speed drives requiring a wide field weakening range. The doubly salient configuration of this machine provides higher flux concentration than sinusoidally distributed flux types and smoother torque production than other doubly salient PM structures due to the fact that the reluctance torque caused by self-inductance variation vs. rotor angle can be greatly canceled. On the other hand, sufficient room is arranged in this design for the use of ferrite PMs which are much less expensive than rare earth PMs. Moreover, because of this special arrangement, the PM reluctance seen by the field winding is fairly low so that the required ampere turns are comparatively small, sufficient to guarantee space for a wound field winding. In fact, PM machines having one hundred percent field weakening capability can be achieved by this method. Another advantage of this motor is that when the field winding is working in the field boosting mode, the starting torque capability can be as high as 2 p.u. and the output power of the machine can be increased by 30% at normal speed.

Referring to FIGS. 13–27, another embodiment of the present invention, functioning as a single-phase doubly salient PM generator 39, includes a rotor 40 comprising six salient rotor poles 41 and a stator 42 comprising four salient stator poles 43 and 44. The rotor poles 41 are positioned at angular intervals θr of π/3. Each rotor pole 41 has a pole arc θpr.

The stator 42 includes a stator yoke 45, which constitutes a cylinder having a round shape in its cross-section. Similar to FIG. 3, the stator yoke 45 has two sections 46, 47 separated by angular intervals 48 larger than those 20 of FIG. 3. Two stator poles 43 are positioned within the section 46, and two stator poles 44 are positioned within the section 44 of the stator yoke 45.

Figure 13:
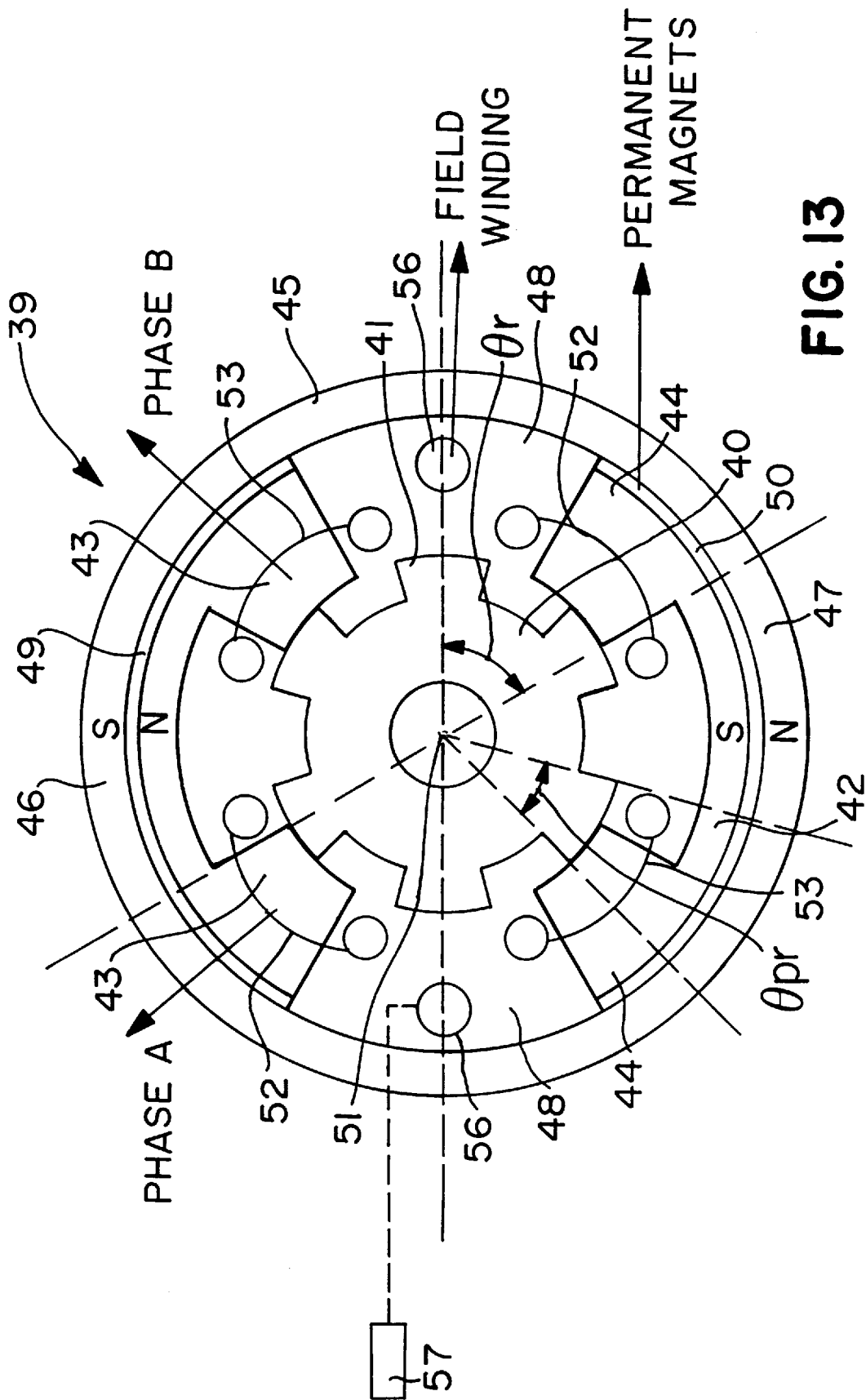
FIG. 13 is a cross-section of a single-phase doubly salient permanent magnet generator of the present invention.

A pair of ferrite arched permanent magnets 49, 50 are embedded in the stator yoke 45, as shown in FIG. 13, and are polarized transversely to the central axis 51 to serve as a source of primary flux for magnetizing the generator 39.

A first and a second armature windings 52, 53 are wound at the respective stator poles 43, 44; each of them consists of a first and a second coil 54, 54', 55, 55' connected in series therebetween and individually wound about diametrically opposite stator poles 43 and 44. The coil 54' of the armature winding 52 is connected to the coil 55 of the armature winding 53.

A field winding 56 is interposed between the sections 46 and 47 and wound along the length of the stator yoke 45. Once the field winding 56 is excited, it produces magnetizing or demagnetizing ampere turns to boost or to weaken the primary flux produced by the permanent magnets 49, 50. Means 57 for energizing the field winding are known to those skilled in the art and are shown schematically in FIG. 13.

To describe the operating principles and control topologies, two operating modes of the field weakening doubly salient permanent magnet generator are considered one is the "bi-directional mode" (BDM) and the other is the "unidirectional mode" (UDM). FIGS. 14, 15 and FIGS. 16, 17, 18 show the winding connections and the possible control topologies, respectively.

Figure 16:
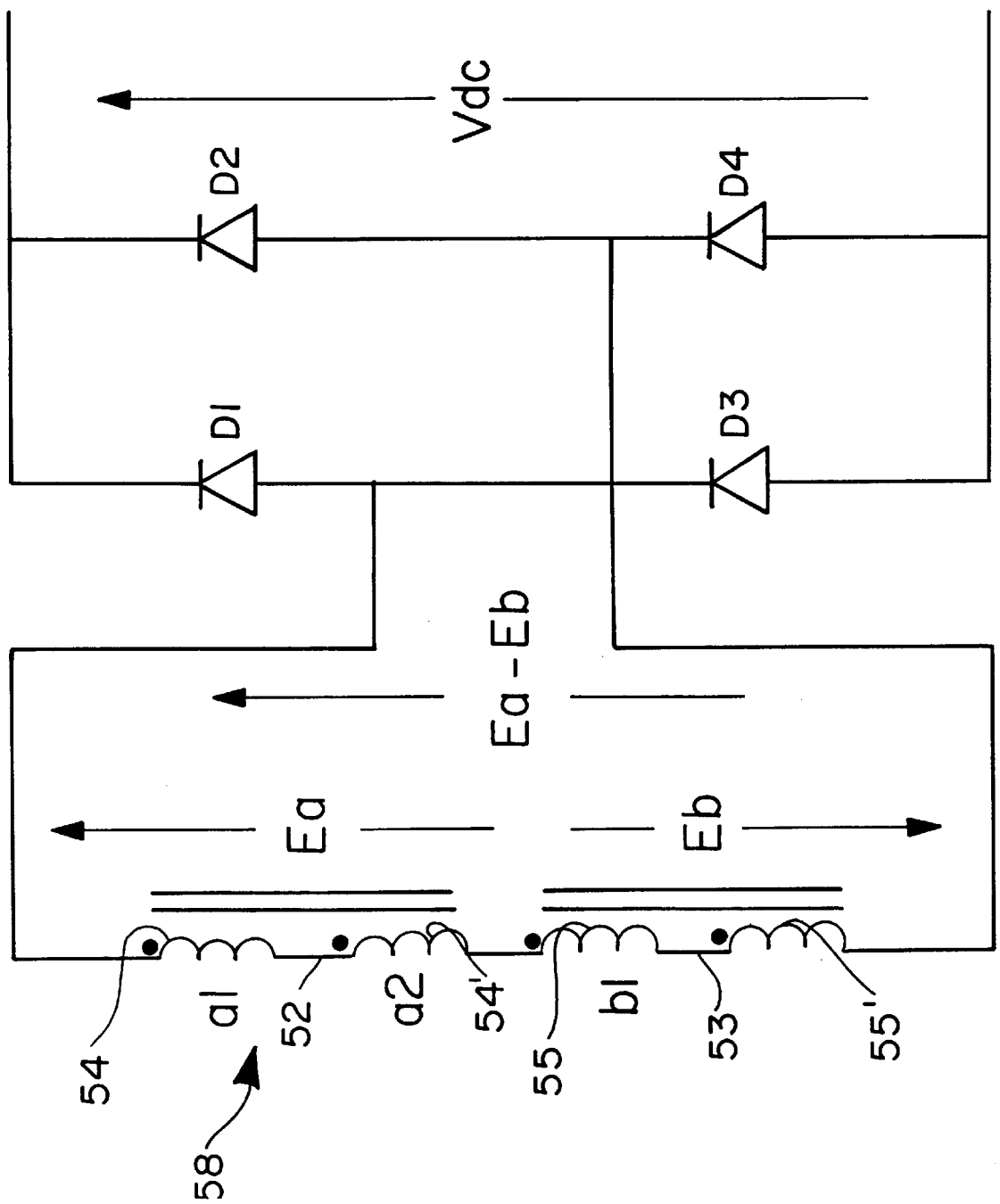
FIG. 16 is a converter topology of the generator of FIG. 8.
Figure 17:
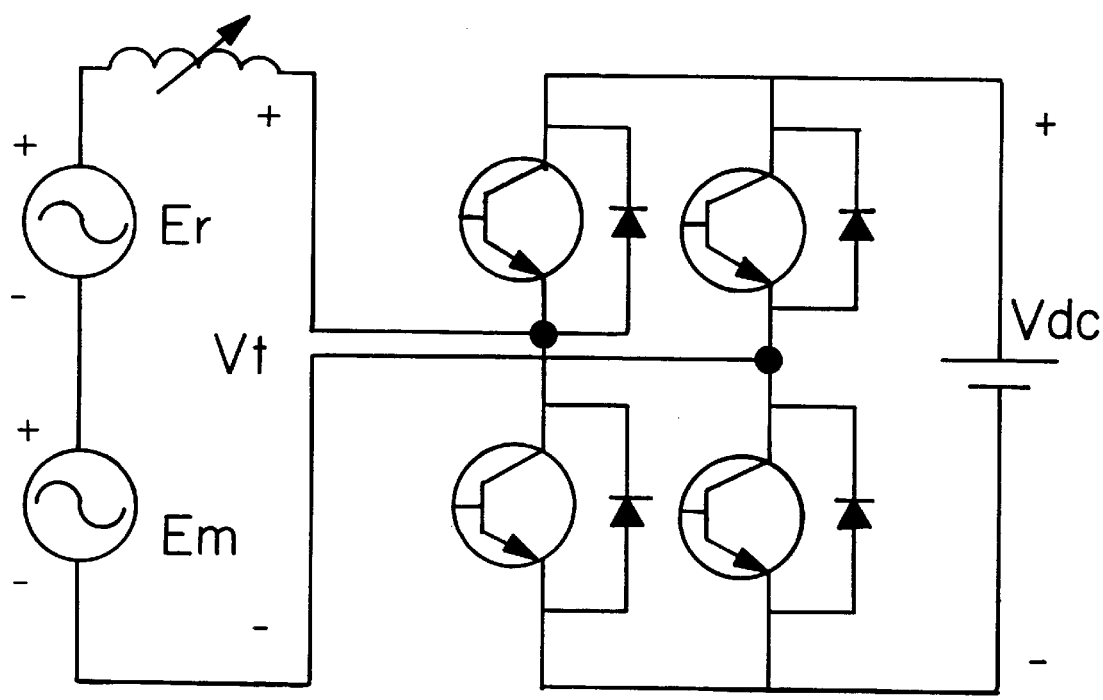
FIG. 17 is a control topology of field weakening doubly salient permanent magnet generator (BDM).
Figure 18:
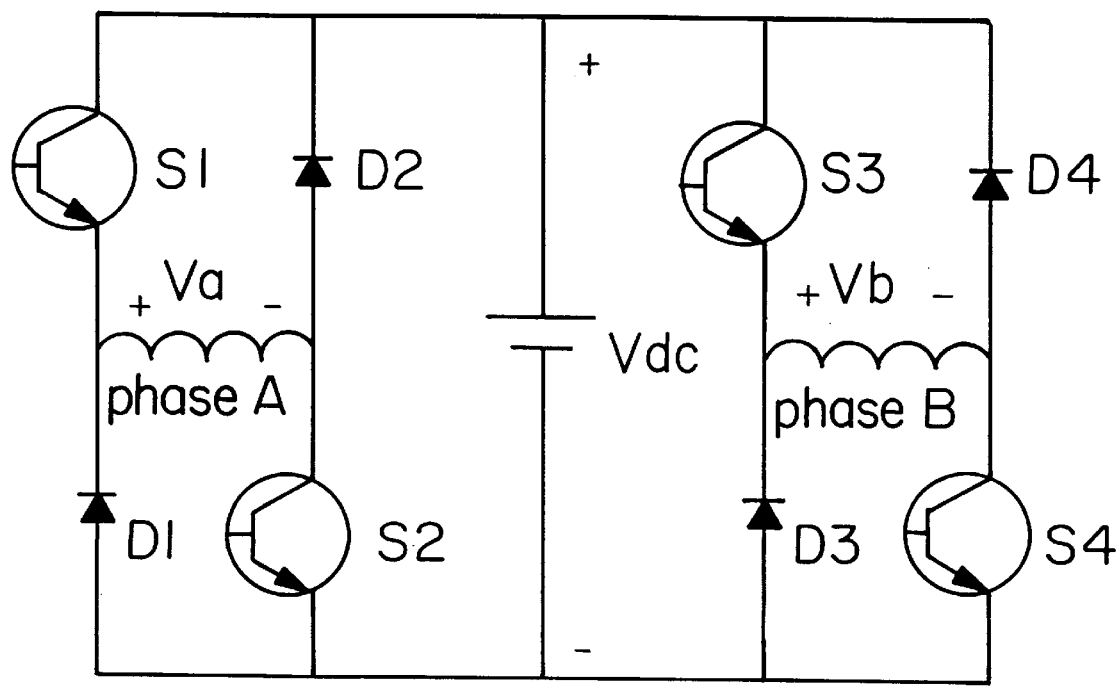
FIG. 18 is a control topology of field weakening doubly salient permanent magnet generator (UDM).
Figure 19:
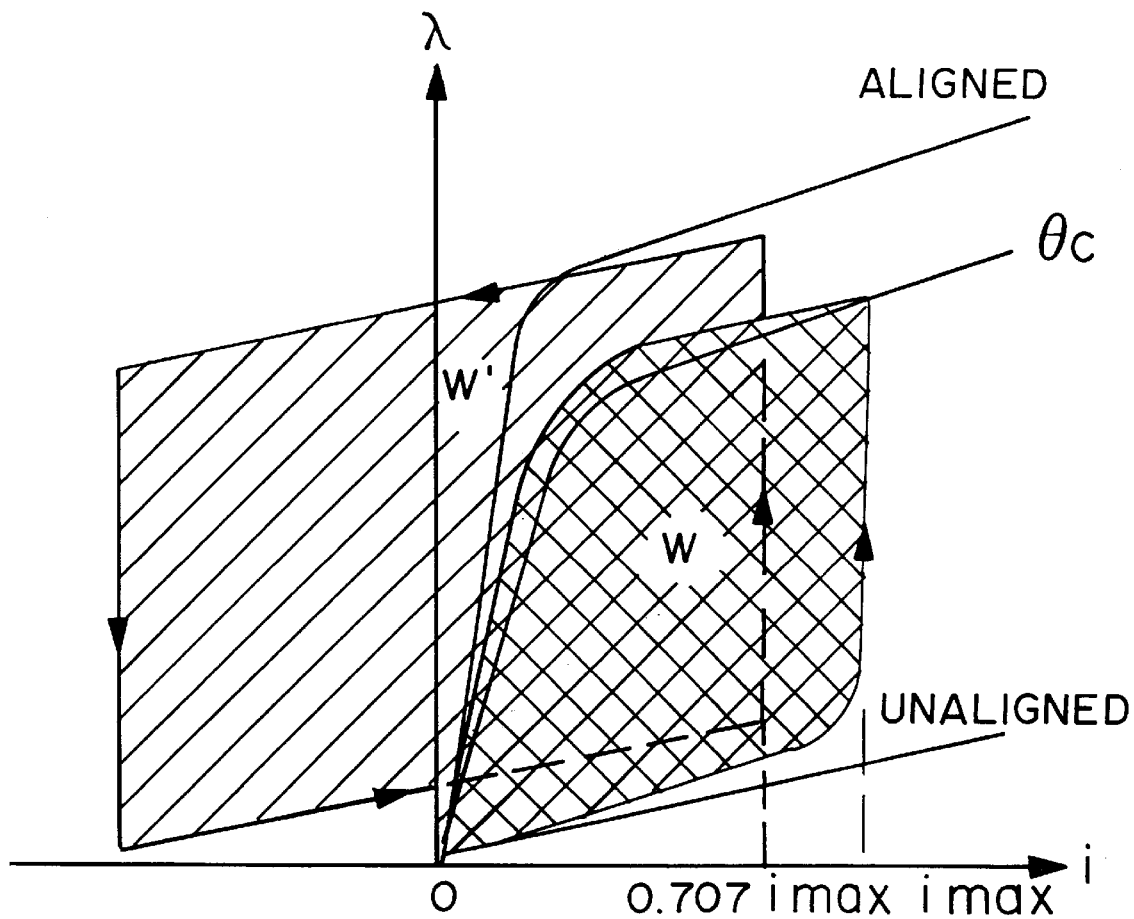
FIG. 19 shows diagrammatically the energy conversion of field weakening doubly salient permanent magnet generator (BDM) compared with VRM (W and W' are energy conversion areas with VRM and field weakening doubly salient permanent magnet, respectively).
Figure 20:
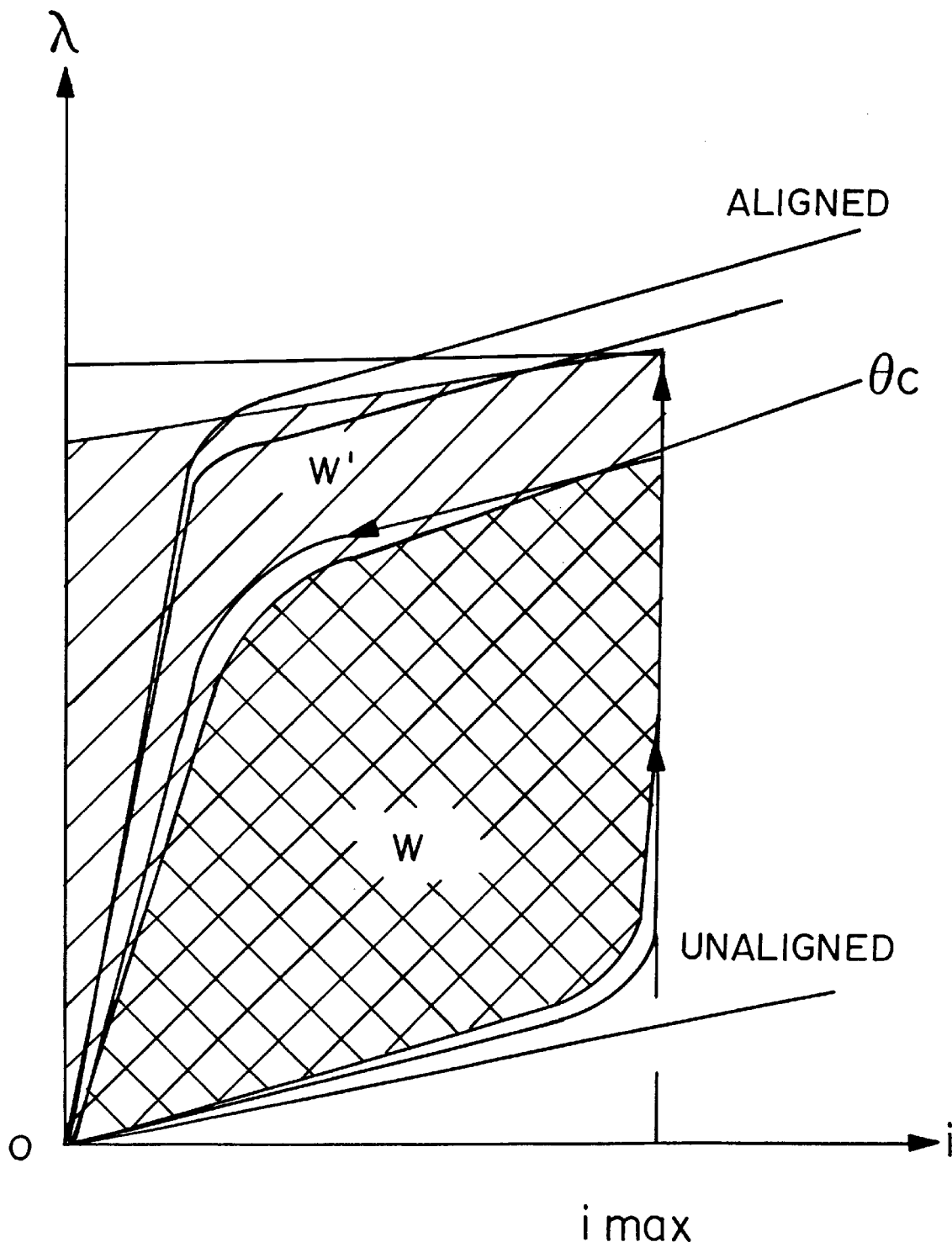
FIG. 20 shows diagrammatically the energy conversion of field weakening doubly salient permanent magnet generator (UDM) compared with VRM (W and W' are energy conversion areas with VRM and field weakening doubly salient permanent magnet, respectively).

As shown in FIG. 16, a converter 58 serves to convert an AC obtained from the armature windings 52 and 53 into a single-phase DC, which is supplied to filtering and output.

Figure 14:
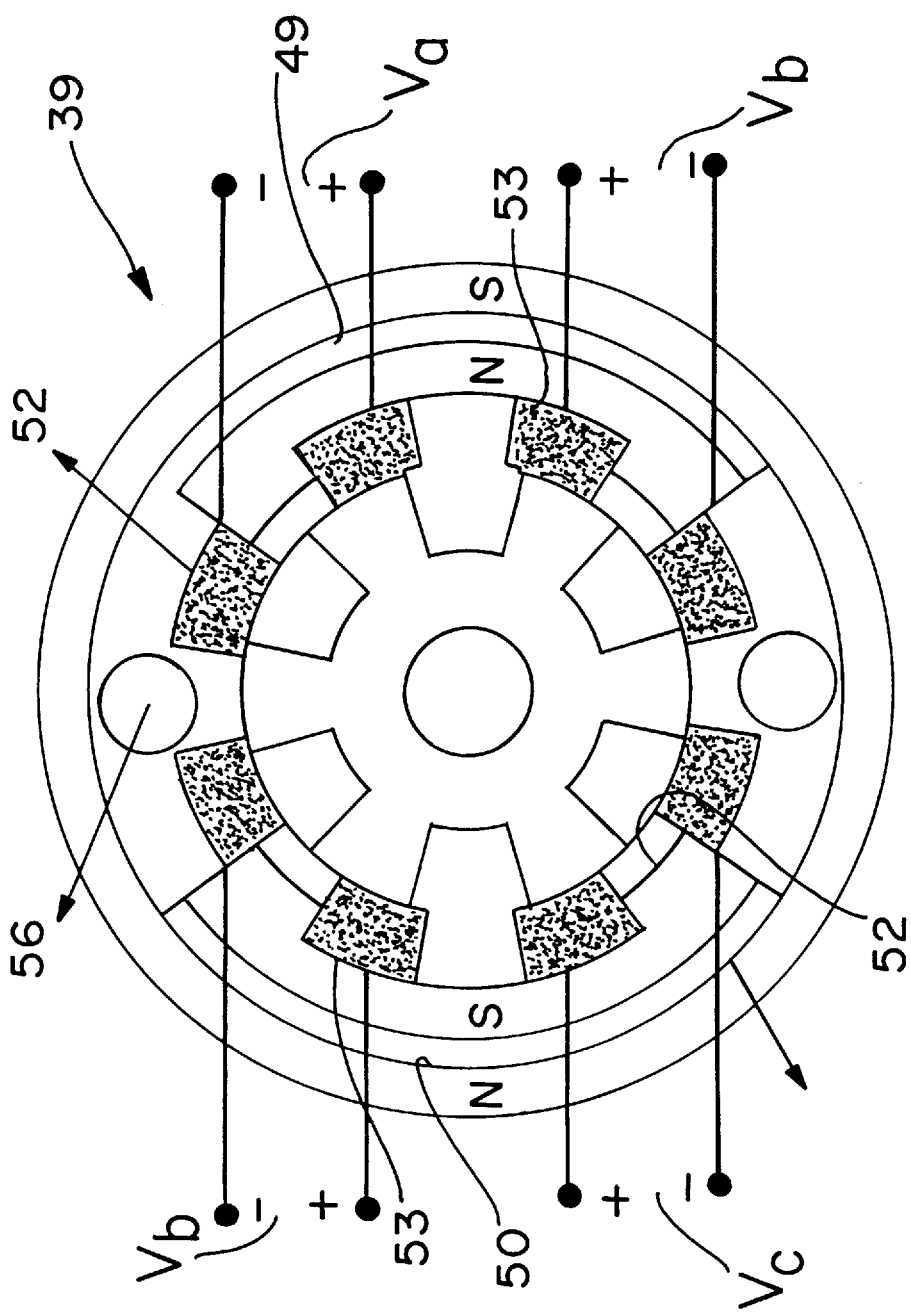
FIG. 14 shows winding connection of field weakening doubly salient permanent magnet generator (BDM) of the present invention.

As shown in FIG. 14, the BDM is based on that the two pole windings under one piece of PM are connected as one phase which causes a double frequency variation of self-inductance compared to that of the PM flux and no mutual inductance should be considered. In this case, the phase current is bi-directional resulting in energy conversion in two quadrants of the B-H plane (shown in FIG. 19). The reluctance torque will pulsate at normal speeds to cause current harmonics so that the inductance of the machine should be designed to be as small as possible.

Figure 15:
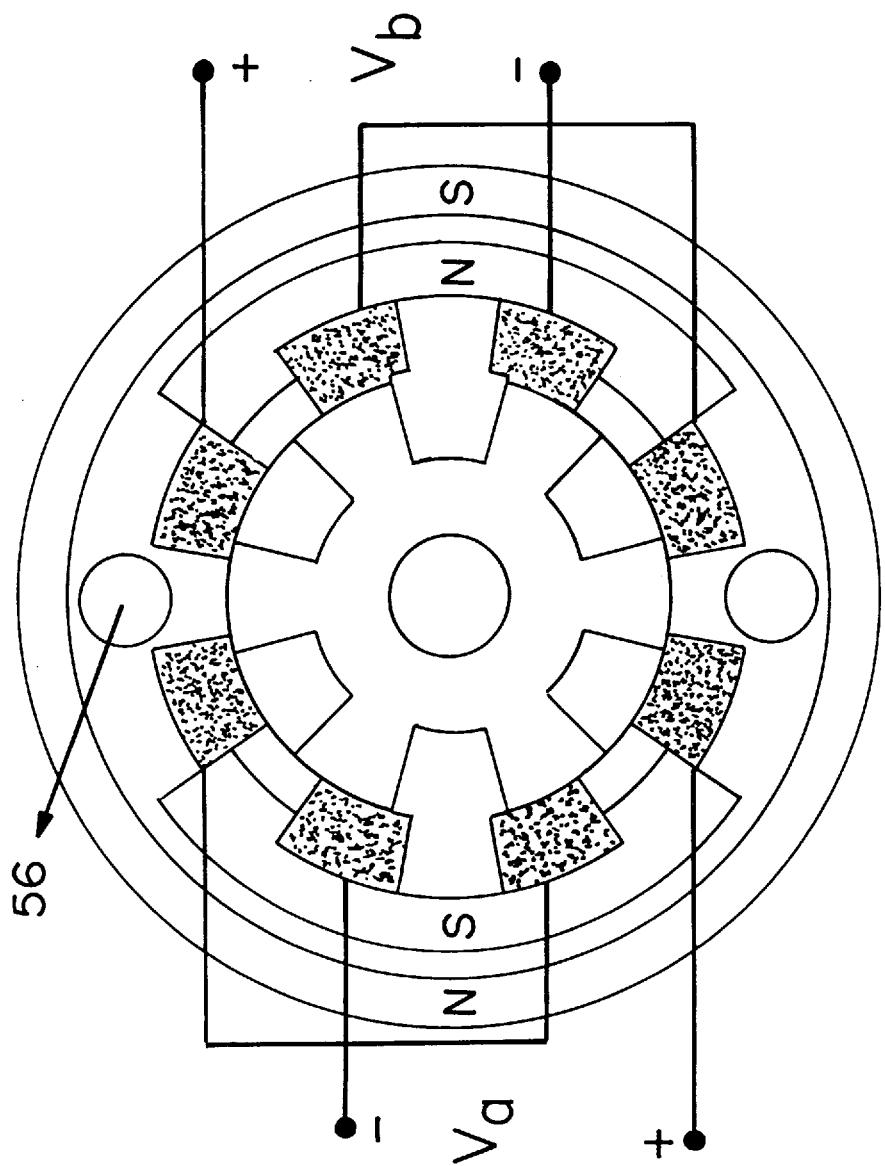
FIG. 15 shows winding connection of field weakening doubly salient permanent magnet generator (UDM) of the present invention.
Figure 21:
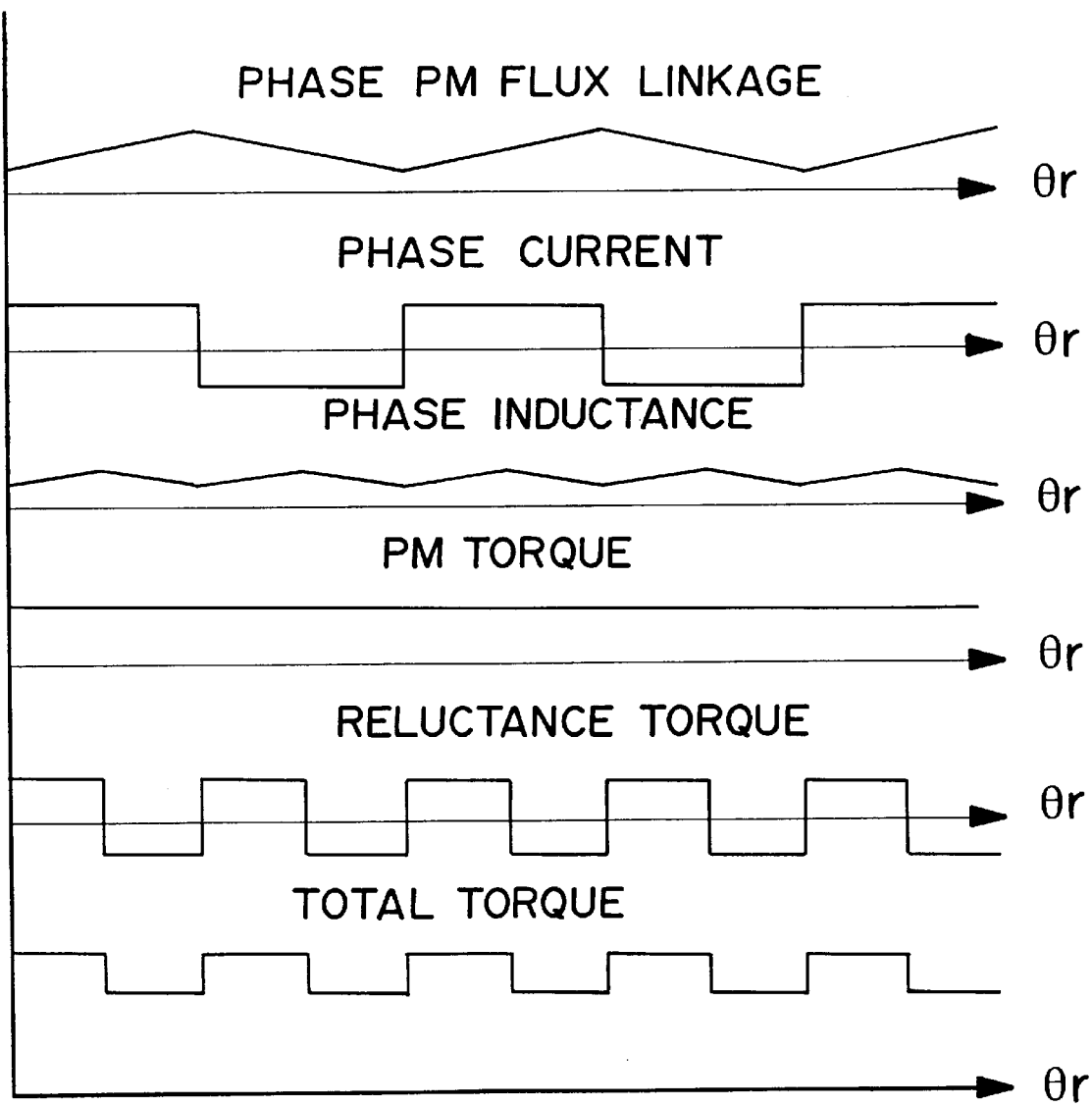
FIG. 21 shows diagrammatically torque production of field weakening doubly salient permanent magnet machine in the bi-directional mode (idealized).
Figure 22:
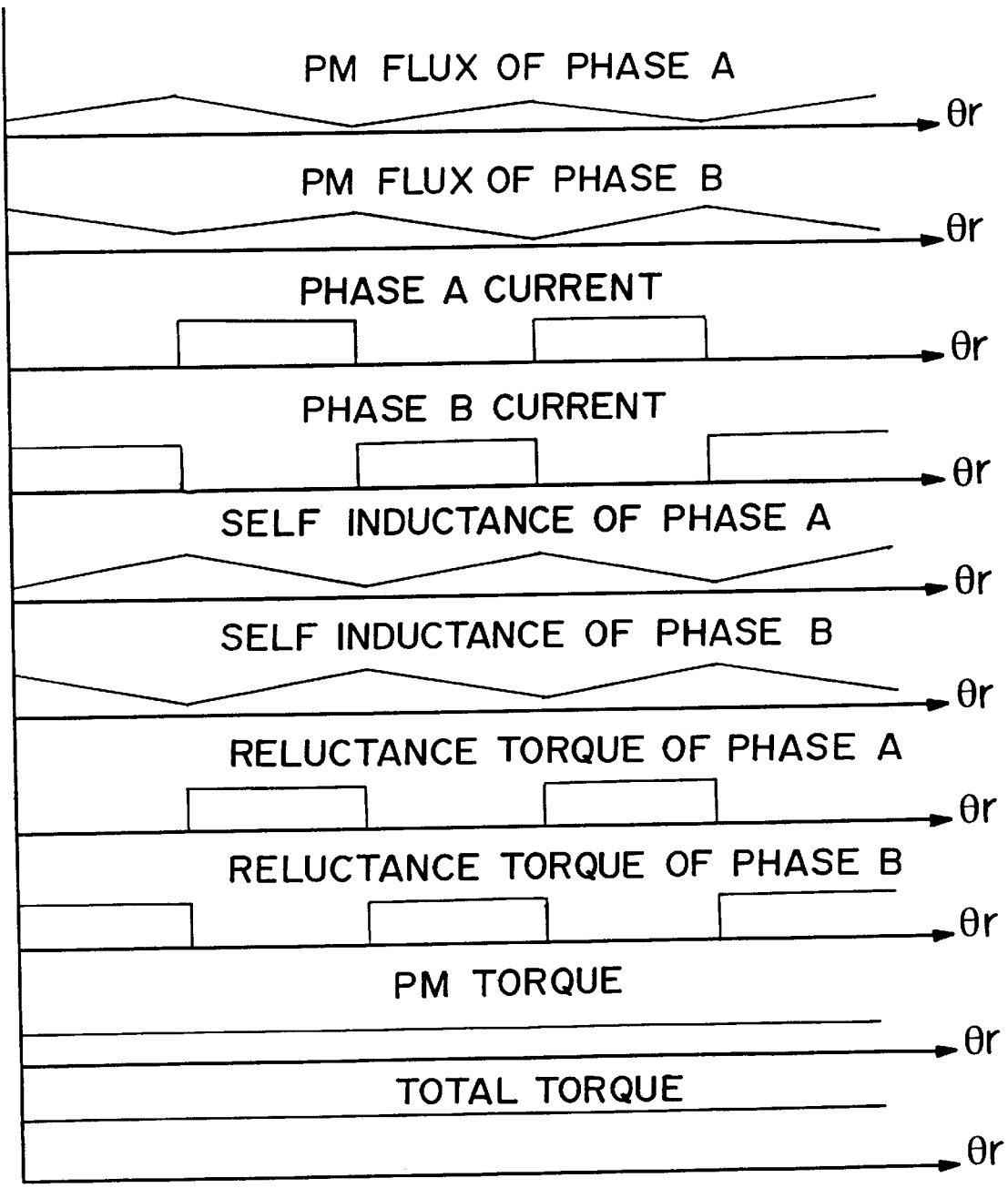
FIG. 22 shows diagrammatically torque production of field weakening doubly salient permanent magnet machine in the unidirectional mode of operation (idealized).

On the other hand, the UDM is based on a two phase connection of the armature winding (shown in FIG. 15). In this case, the machine is operated similar to a SRM and the energy conversion occurs only in the first quadrant on the λ-i plane (shown in FIGS. 19 and 20) so that only a half period for each phase is used to produce armature reaction so as to always magnetize the PM field and thus drive the machine to a highly saturated condition. Armature reaction is made useful in the UDM in the form of reluctance torque for which higher inductance could be designed and the control topology is simpler (see FIG. 18) similar to those for SRMs. The frequency of inductance variation vs. rotor angle for UDM is the same as that of the PM flux linkage, which contributes to a smooth reluctance torque production. Torque production for both operating modes are depicted in FIGS. 21 and 22.

The phase voltage equations of this new machine can be expressed as follows:

$$\begin{bmatrix} ua \\ ub \end{bmatrix} = \begin{bmatrix} ra & 0 \\ 0 & rb \end{bmatrix} \begin{bmatrix} ia \\ ib \end{bmatrix} + \begin{bmatrix} ema \\ emb \end{bmatrix} + \frac{d}{dt} \begin{bmatrix} \lambda a \\ \lambda b \end{bmatrix} \quad (34)$$

where $$\begin{bmatrix} \lambda a \\ \lambda b \end{bmatrix} = \begin{bmatrix} Laa & Mab \\ Mba & Lbb \end{bmatrix} \begin{bmatrix} ia \\ ib \end{bmatrix} = [L] \begin{bmatrix} ia \\ ib \end{bmatrix} \quad (35)$$

and $$\frac{d}{dt} \begin{bmatrix} \lambda a \\ \lambda b \end{bmatrix} = [L] \frac{d}{dt} \begin{bmatrix} ia \\ ib \end{bmatrix} + \begin{bmatrix} \frac{d[L]}{dt} \end{bmatrix} \begin{bmatrix} ia \\ ib \end{bmatrix} \quad (36)$$

So that $$[ia\ ib] \begin{bmatrix} ua \\ ub \end{bmatrix} = [ia\ ib][R] \begin{bmatrix} ia \\ ib \end{bmatrix} + [ia\ ib] \begin{bmatrix} ema \\ emb \end{bmatrix} + \quad (37)$$

$$[ia\ ib][L] \frac{d}{dt} \begin{bmatrix} ia \\ ib \end{bmatrix} + [ia\ ib] \begin{bmatrix} \frac{d[L]}{dt} \end{bmatrix} \begin{bmatrix} ia \\ ib \end{bmatrix}$$

where
Equation (37) can be interpreted as follows:

$$P_{in} = P_{cu} + T_m \times \omega_r + T_r \times \omega_r + \frac{d}{dt} W_f \quad (38)$$

where a) the input power is $$P_{in} = [ia\ ib] \begin{bmatrix} ua \\ ub \end{bmatrix} \quad (39)$$

b) with copper loss $$P_{cu} = [ia\ ib] \begin{bmatrix} ra & 0 \\ 0 & rb \end{bmatrix} \begin{bmatrix} ia \\ ib \end{bmatrix} \quad (40)$$

c) the PM portion of the torque is $$T_m = [ia\ ib] \begin{bmatrix} \frac{d\psi ma}{d\theta r} \\ \frac{d\psi mb}{d\theta r} \end{bmatrix} \quad (41)$$

d) the reluctance torque is $$T_r = \frac{1}{2} [ia\ ib] \begin{bmatrix} \frac{d[L]}{d\theta r} \end{bmatrix} \begin{bmatrix} ia \\ ib \end{bmatrix} \quad (42)$$

where:

$$[L] = \begin{bmatrix} Laa & Mba \\ Mab & Lbb \end{bmatrix}$$

e) energy stored in armature windings $$W_f = \frac{1}{2} [ia\ ib][L] \begin{bmatrix} ia \\ ib \end{bmatrix} \quad (43)$$

Also from (34), the dynamic equations of the field weakening doubly salient permanent magnet generator can be expressed by:

$$\frac{d}{dt} \begin{bmatrix} ia \\ ib \end{bmatrix} = [L]^{-1}\{[V] - [E]\} - [L]^{-1} \left\{ [R] + \begin{bmatrix} \frac{d[L]}{d\theta r} \end{bmatrix} \omega r \right\} \begin{bmatrix} ia \\ ib \end{bmatrix} \quad (44)$$

where 1) [V] is the control vector $$[V] = \begin{bmatrix} ua \\ ub \end{bmatrix} \quad (45)$$

2) [E] is the PM voltage vector

3) [R] is the resistance matrix $$[R] = \begin{bmatrix} ra & 0 \\ 0 & rb \end{bmatrix} \quad (46)$$

Figure 23:
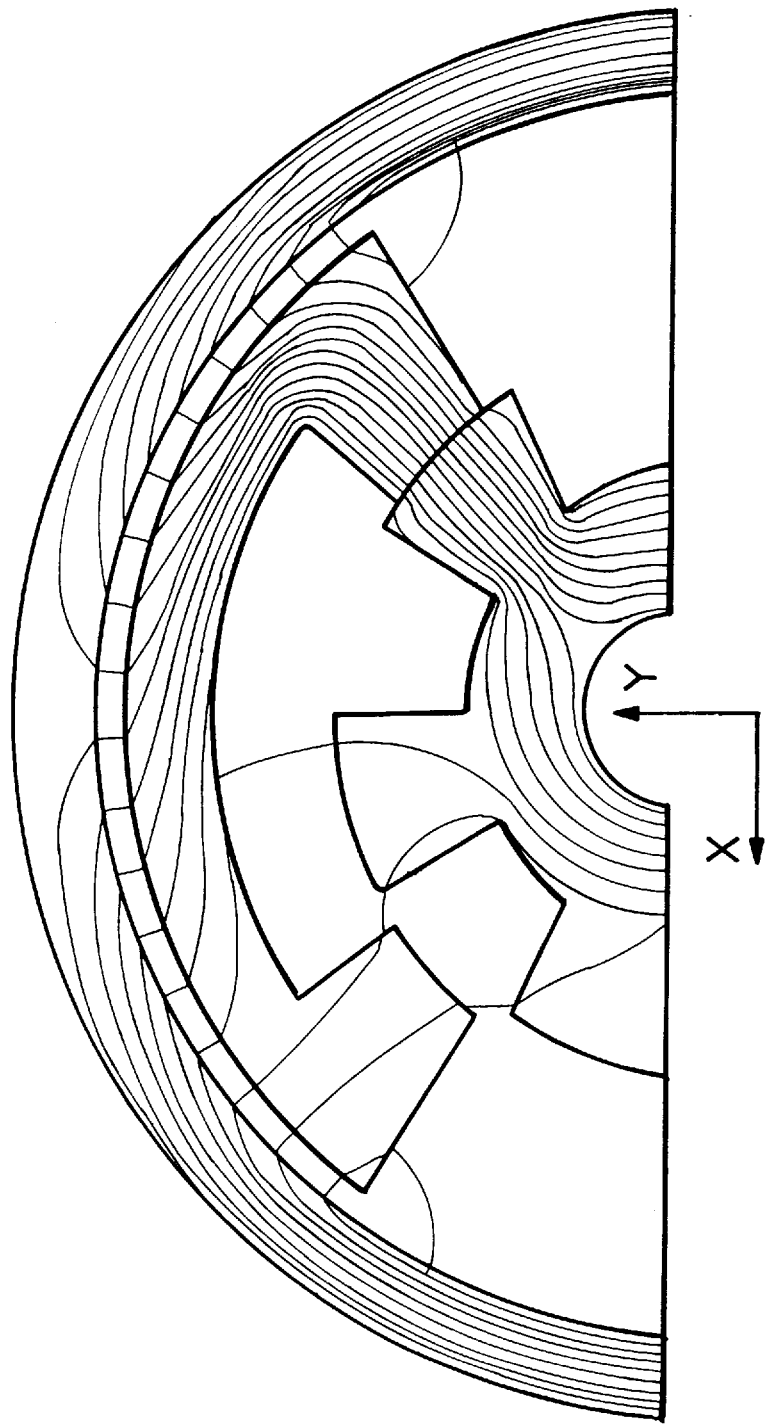
FIG. 23 shows a flux distribution of the field weakening doubly salient permanent magnet generator when PM excitation exists only.

Machine parameters in (44) can be obtained from finite element analysis (FEA) and a digital computer simulation can be carried out by using the dynamic equations which have been presented. Furthermore, control strategies or the trajectory of the vector [V] can be studied based on this model. In particular, the PM field control characteristics of the machine must be examined and will be the subject of a future paper. The PM voltage vector can be written as:

$$[E] = \begin{bmatrix} ema \\ emb \end{bmatrix} = \begin{bmatrix} \dfrac{d\psi ma}{dt} \\ \dfrac{d\psi mb}{dt} \end{bmatrix} = \begin{bmatrix} \dfrac{d(\varphi ma + L_{maif})}{dt} \\ \dfrac{d(\varphi mb + L_{mbif})}{dt} \end{bmatrix} = \begin{bmatrix} \dfrac{d\varphi ma}{dt} \\ \dfrac{d\varphi mb}{dt} \end{bmatrix} + \begin{bmatrix} \dfrac{dLma}{dt} if \\ \dfrac{dLmb}{dt} if \end{bmatrix} + \begin{bmatrix} Lma\dfrac{dif}{dt} \\ Lmb\dfrac{dif}{dt} \end{bmatrix} \quad (47)$$

where $\Phi_{ma}$—no load PM flux linked by phase A $\Phi_{mb}$—no load PM flux linked by phase B $L_{ma}$—magnetizing inductance of the field winding for phase A $L_{mb}$—magnetizing inductance of the field winding for phase B $i_f$—field winding current A finite element analysis for a 5 kW prototype field weakening doubly salient permanent magnet generator of the present invention has been performed to demonstrate the operating principle. FIG. 23 shows flux distribution when PM excitation exists only. The very high concentration of magnet flux in one of the stator poles is apparent. Flux densities in the air gap on the order of 1.5 Tesla can be readily achieved even though the remnant flux density of the ferrite magnet was only 0.4 Tesla. This in turn, demonstrates a flux focusing ability of a factor of four, far in excess of conventional buried PM machines.

Figure 24:
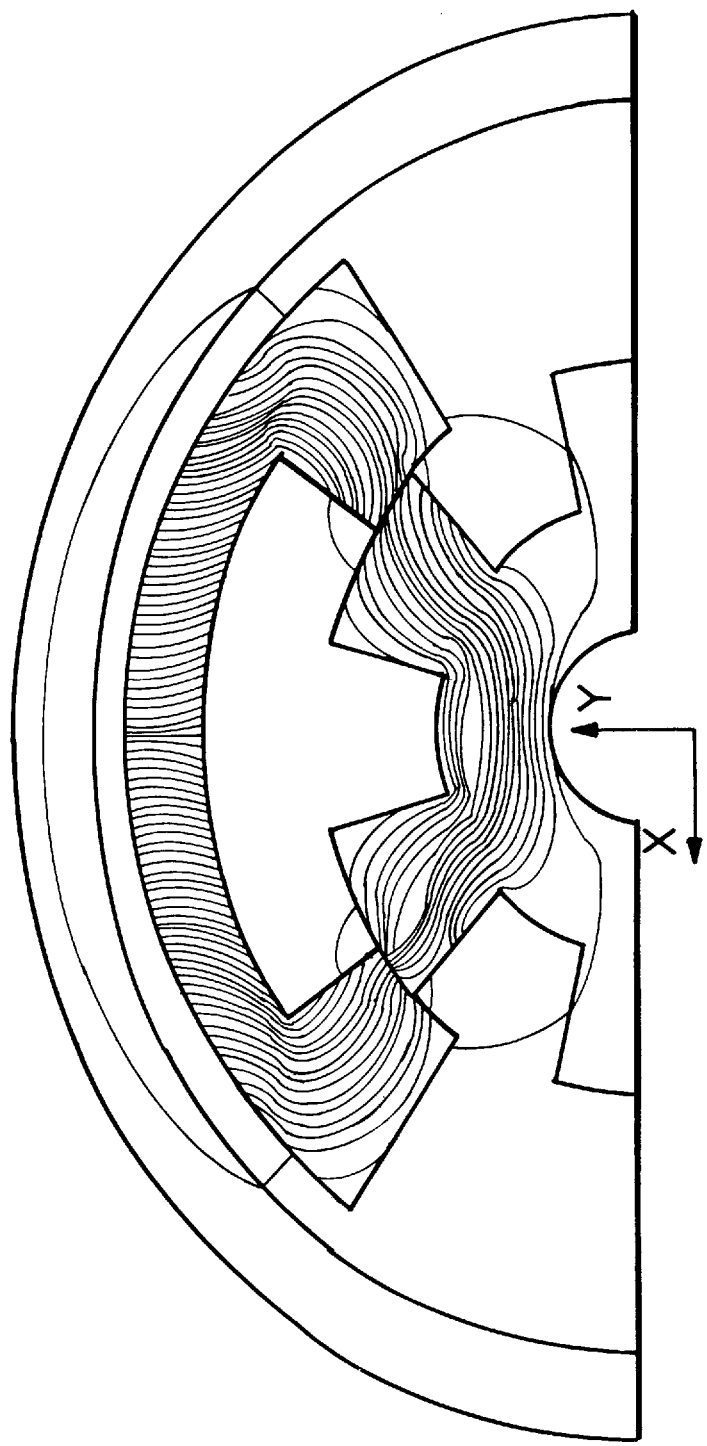
FIG. 24 shows a flux distribution of the field weakening doubly salient permanent magnet generator when armature current excitation exists only.
Figure 25:
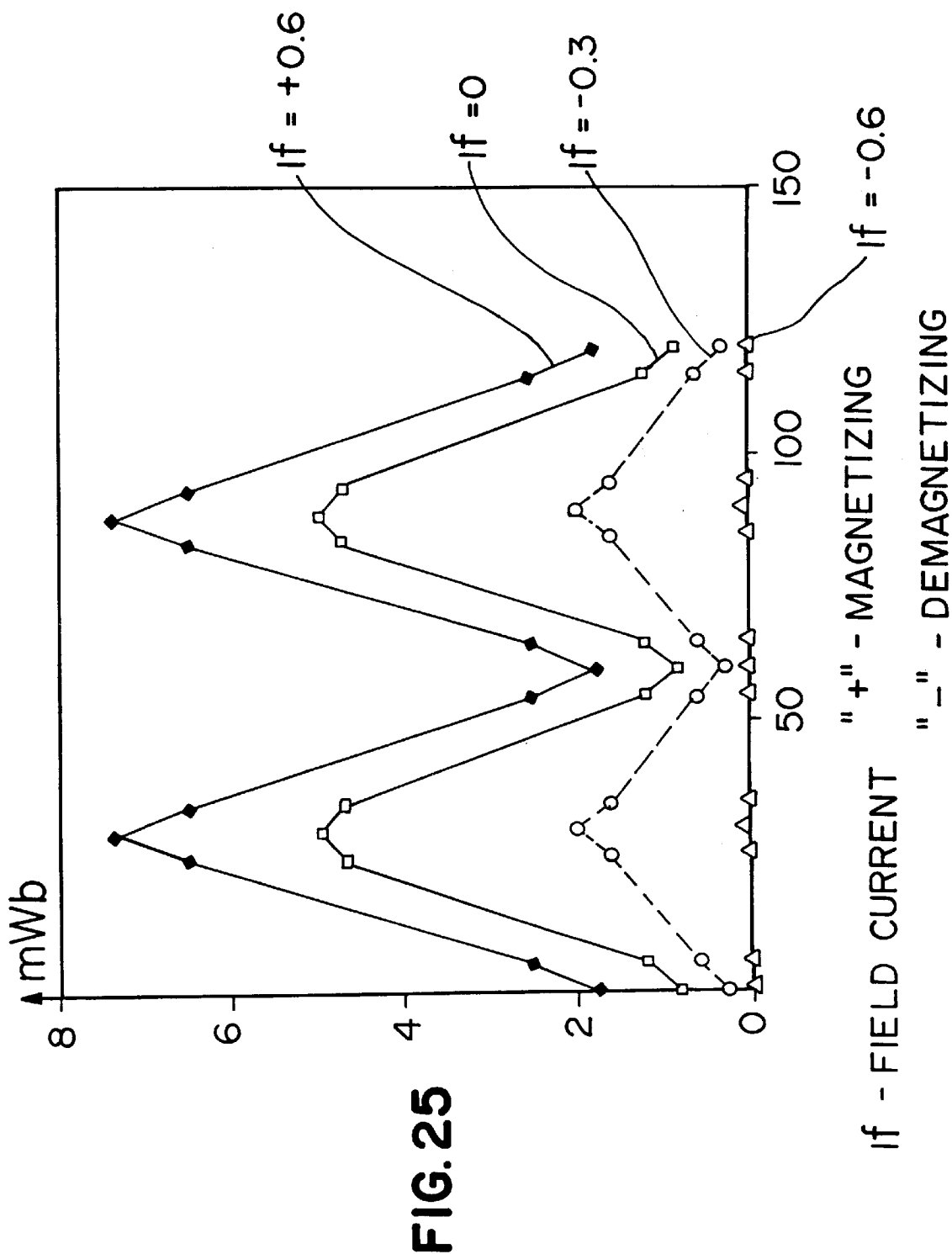
FIG. 25 shows phase permanent magnet flux linkage versus rotor angle under different levels of field current excitation.

FIG. 24 shows flux distribution when armature current exists only. The maximum inductance position is shown which occurs when the stator and rotor poles are half-overlapped. The reluctance torque produced by the armature current is zero at this point.

The demagnetizing MMF provided by the field winding only by using 60–90% of the per unit field current (unit field current here is defined as the point where the volume current density of copper reaches 3000 A/in$^2$).

Digital simulations have been carried out for the design of a 5 kW prototype field weakening doubly salient permanent magnet generator. Machine data and performance calculation results are shown below:

| Machine Data | |
|---|---|
| stator outer diameter | 28.5 cm |
| stator inner diameter | 20.0 |
| stack length | 18.3 cm |
| stator pole number poles | 4 |
| rotor pole number poles | 6 |
| stator/rotor pole arc | 20°/30° |

-continued

| | | |
|---|---|---|
| stator slot depth | 1.8 | cm |
| Machine Performance (BDM) | | |
| DC bus voltage | 150 | volts |
| maximum inductance | 0.81 | mH |
| minimum inductance | 0.20 | mH |
| phase peak current | 75 | A |
| phase current RMS | 64.5 | A |
| output power | 5.31 | kW |
| efficiency | 96.0% | |
| Machine Performance (UDM) | | |
| DC bus voltage | 150 | volts |
| maximum inductance | 0.76 | mH |
| minimum inductance | 0.57 | mH |
| phase peak current | 63 | A |
| phase current RMS | 55.4 | A |
| output power | 5.21 | kW |
| efficiency | 96.0% | |

Figure 26:
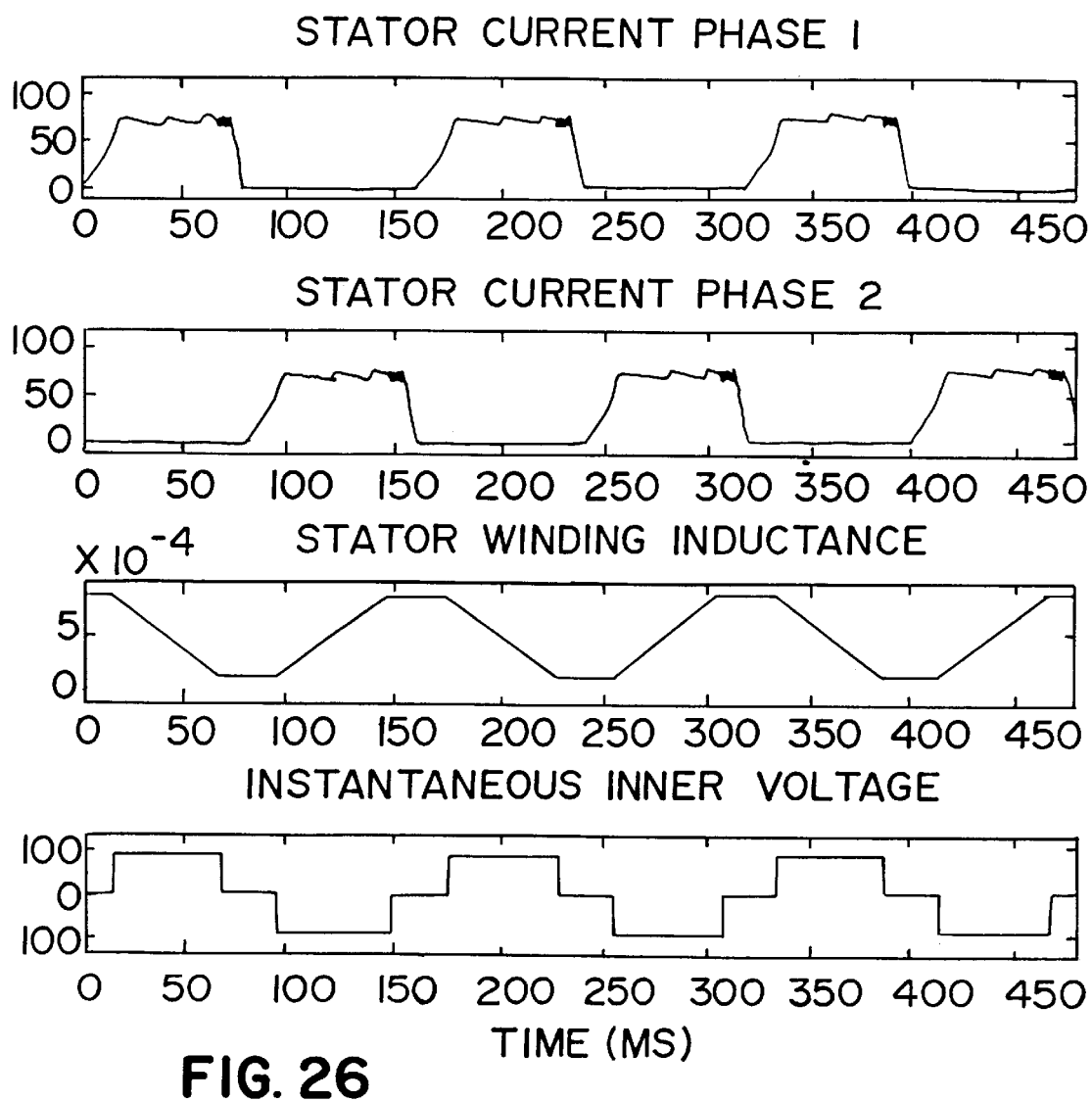
FIG. 26 shows diagrammatically simulation results of the generator (UDM) of the present invention.
Figure 27:
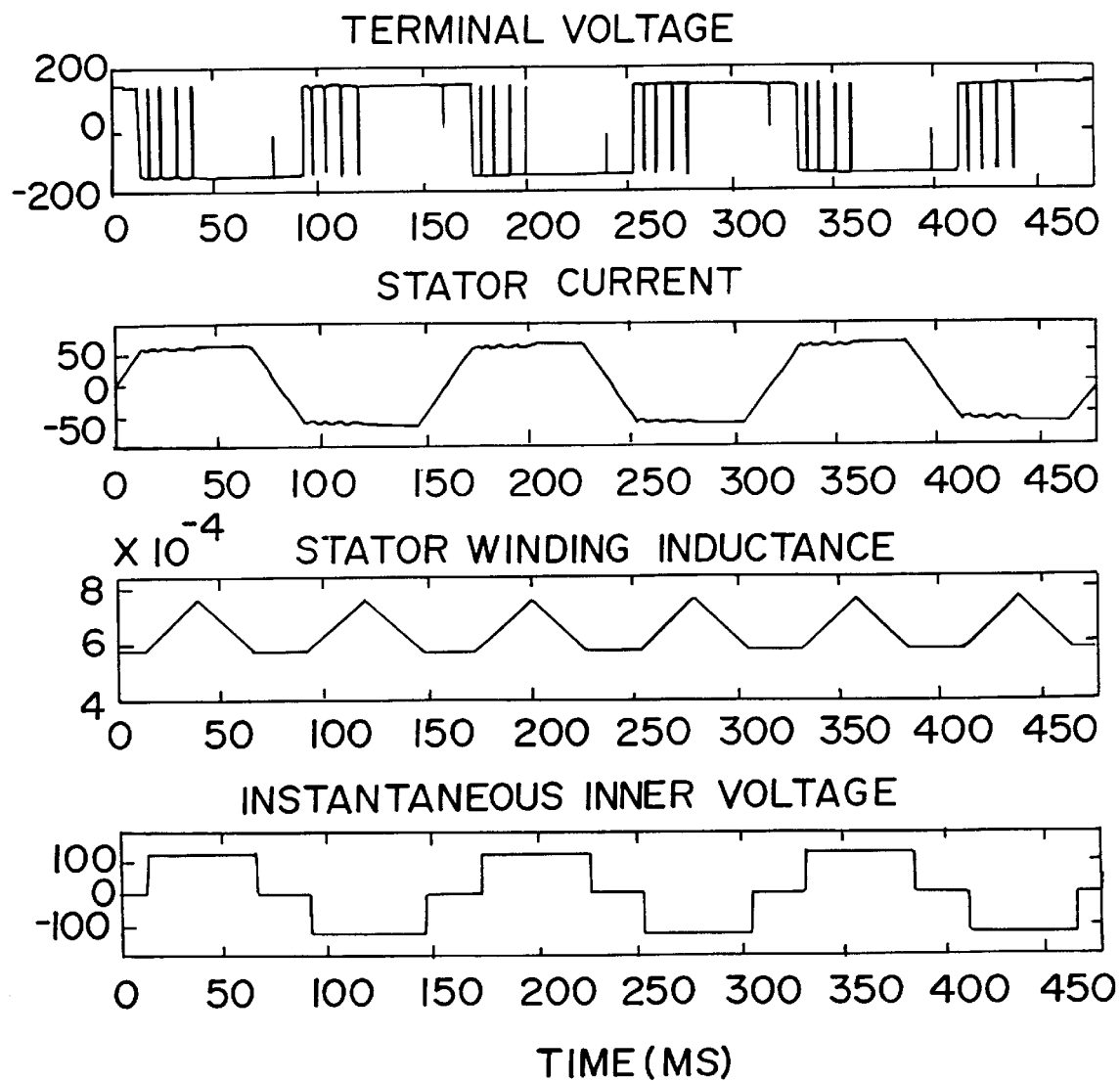
FIG. 27 shows diagrammatically simulation results of the generator (BDM) of the present invention.

The simulations are based on the derived dynamic equations and the parameters obtained from the FEA. The current and voltage waveforms are shown in FIGS. 26 and 27 for both operating modes, respectively. While this simulation was based on a finite element study, several rotor positions were chosen to calculate inductances and a simple linear inductance variation between two adjacent positions assumed. Also, it can be noted that, as a result, the inductance is assumed to vary linearly and that the EMF is "square."

As discussed above in reference to FIGS. 13–27, the new electrical machine with capability for field weakening with PM excitation, combined with high power density, low cost, and a mechanically robust structure can be realized based on the proposed concept. From the analyses, it is shown that this generator can be operated in a very wide speed range without losing high performance which indicates that this new type of PM generator has high potential for variable speed (especially high speed) electric generations applications. The low cost realization of field weakening capability of this PM generator should make widespread use of this type of machine possible in the near future.

The machine proposed in this invention and discussed in conjunction with FIGS. 13–27, will be suitable for a variety of high performance electric generating applications, regardless of the power or speed range, or the number of poles of machines, provided a 4/6 stator/rotor pole ratio is kept.

The combination of the principle of variable reluctance machines, with the use of specific arrangement, shape, and placement of PM, utilizing ferrite permanent magnets instead of rare earth permanent magnets results in a machine possessing a lower cost, lighter weight, higher power density machine, field weakening or boosting capability, and easier demagnetization protecting realization for electric machine manufacturers.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A permanent magnet machine comprising:
   a rotor mounted for rotation about a central axis and comprising:
   a plurality of salient rotor poles being spaced at equal angular intervals around said central axis and extending radially outward therefrom;

a stator comprising:

a stator yoke, the stator yoke being of a round shape in its cross-section and having first and second similar sections, arranged symmetrically around the central axis, a first and a second plurality of salient stator poles being spaced at equal angular intervals around the central axis and extending radially inward from the stator yoke, said first section having said first plurality of stator poles, and said second section having said second plurality of stator poles, and first and second arched permanent magnets embedded in the stator yoke, the first permanent magnet being interposed between the first section of the stator yoke and said first plurality of the stator poles, and the second permanent magnet being interposed between the second section of the stator yoke and said second plurality of the stator poles, said first and second permanent magnets forming a primary flux path through said stator yoke between said first and second sections;

a plurality of armature windings, each being individually coiled about a stator pole of said first plurality of stator poles and a diametrically opposite stator pole of said second plurality of stator poles, and a field winding excited by a constant or slowly varying current permanently coupled with said primary flux path and interposed between said first and second sections and wound along a length of the stator yoke.

2. The machine of claim 1, wherein the first and second permanent magnets extend the length of the stator yoke and in their cross-sections are of a round shape.

3. The machine of claim 1, wherein the first and the second permanent magnets are ferrite permanent magnets.

4. The machine of claim 1, wherein said plurality of armature windings is a three-phase armature winding.

5. The machine of claim 1, wherein said first and second permanent magnets are polarized transversely in a radial magnetization direction to said central axis to serve as a source of primary flux for magnetizing the machine.

6. The machine of claim 5, wherein the field winding once excited produces magnetizing or demagnetizing ampere turns to boost or to weaken the primary flux produced by the first and the second permanent magnets.

7. The machine of claim 5, wherein the field winding detects the rotor position.

8. The machine of claim 1, wherein said plurality of rotor poles includes four rotor poles, said first plurality of stator poles includes three stator poles, and said second plurality of stator poles includes three stator poles, wherein said plurality of armature windings comprises three armature windings, each of said three armature windings including two coils connected together, each of said coils being wound about one of a diametrically opposite stator pole, and each of said three armature windings being connected to a separate phase of a three-phase source of alternating current.

9. The machine of claim 8, further including converter means connected to said armature windings and converting a three-phase alternating current power to unregulated direct current.

10. The machine of claim 1, further including means for energizing the field winding.

11. The machine of claim 1, wherein a ratio of said plurality of rotor poles to said plurality of stator poles is 4:6.

12. The machine of claim 11, working as a motor.

13. The machine of claim 11, working as a generator.

14. The machine of claim 1, wherein said plurality of rotor poles includes six rotor poles, wherein said plurality of stator poles includes four stator poles, and wherein said plurality of armature windings includes first and second armature windings, each of said first and second armature windings including first and second coils connected in series therebetween, each of said first and second coils being wound about one of a diametrically opposite stator pole, the second coil of the first armature winding being connected to the first coil of the second winding, and said machine further including converter means connected to the first coil of the first armature winding and to the second coil of the second armature winding, said converter means converting an alternating single-phase current obtained from the first and second armature windings to direct current.

15. A permanent magnet machine comprising:

a rotor mounted for rotation about a central axis and comprising:

four salient rotor poles being spaced at equal angular intervals around said central axis and extending radially outward therefrom;

a stator comprising:

a stator yoke, the stator yoke being of a round shape in its cross-section and having first and second similar sections, arranged symmetrically around the central axis, six salient stator poles being spaced at equal angular intervals around the central axis and extending radially inwardly of the stator yoke, said first section having first three stator poles, and said second section having another three stator poles, and first and second ferrite arched permanent magnets embedded in the stator yoke and polarized transversely in a radial magnetization direction to said central axis to serve as a source of primary flux for magnetizing the machine, the first permanent magnet being interposed between the first section of the stator yoke and said first three stator poles, and the second permanent magnet being interposed between the second section of the stator yoke and said another three stator poles, the first and second permanent magnets extending the length of the stator yoke and in their cross-sections being of a round shape;

three-phase armature windings, each being individually coiled about a stator pole of said first three stator poles and a diametrically opposite stator pole of said another three stator poles;

a field winding interposed between said first and second sections and wound along the length of the stator yoke; wherein, when said field winding is excited, it produces magnetizing or demagnetizing ampere turns to boost or to weaken the primary flux produced by the first and the second permanent magnets; and wherein, when said field winding is not activated, it detects the rotor position, each of said three armature windings being connected to a separate phase of a three-phase source of alternating current;

converter means connected to said armature windings and converting a three-phase alternating current power to unregulated direct current; and means for energizing the field winding with slowly varying current.

16. A permanent magnet single-phase generator comprising:

a rotor mounted for rotation about a central axis and comprising:

six salient rotor poles being spaced at equal angular intervals around said central axis and extending radially outward therefrom;

a stator comprising:

a stator yoke, the stator yoke being of a round shape in its cross-section and having first and second similar sections, arranged symmetrically around the central axis, four salient stator poles being spaced at equal angular intervals around the central axis and extending radially inward from the stator yoke, said first section having first two stator poles, and said second section having another two stator poles, and first and second ferrite arched permanent magnets embedded in the stator yoke and polarized transversely in a radial magnetization direction to said central axis to serve as a source of primary flux for magnetizing the machine, the first permanent magnet being interposed between the first section of the stator yoke and said first two stator poles, and the second permanent magnet being interposed between the second section of the stator yoke and said another two stator poles, the first and second permanent magnets extending the length of the stator yoke and in their cross-sections being of a round shape;

first and second armature windings, each of said first and second armature windings including first and second coils connected in series therebetween, each of said first and second coils being individually wound about one of a diametrically opposite stator pole, the second coil of the first armature winding being connected to the first coil of the second armature winding;

a field winding interposed between said first and second sections and wound along the length of the stator yoke; wherein, when said field winding is excited, it produces magnetizing or demagnetizing ampere turns to boost or to weaken the primary flux produced by the first and the second permanent magnets;

means for energizing the field winding with slowly varying current; and a converter means connected to the first coil of the first armature winding and to the second coil of the second armature winding, said converter means converting an alternating current obtained from the first and second armature windings into single-phase direct current.

* * * * *